(12) United States Patent
Wang et al.

(10) Patent No.: US 12,501,325 B2
(45) Date of Patent: Dec. 16, 2025

(54) METHOD AND APPARATUS FOR DETERMINING DAPS HANDOVER FAILURE TYPE

(71) Applicant: Datang Mobile Communications Equipment Co., Ltd., Beijing (CN)

(72) Inventors: Ruiwei Wang, Beijing (CN); Aijuan Liu, Beijing (CN)

(73) Assignee: Datang Mobile Communications Eqipment Co., Ltd., Beijing (CN)

( * ) Notice: Subject to any disclaimer, the term of this patent is extended or adjusted under 35 U.S.C. 154(b) by 350 days.

(21) Appl. No.: 18/249,976

(22) PCT Filed: Oct. 18, 2021

(86) PCT No.: PCT/CN2021/124449
§ 371 (c)(1),
(2) Date: Apr. 21, 2023

(87) PCT Pub. No.: WO2022/083550
PCT Pub. Date: Apr. 28, 2022

(65) Prior Publication Data
US 2023/0388873 A1     Nov. 30, 2023

(30) Foreign Application Priority Data
Oct. 21, 2020 (CN) .......................... 202011133882.0

(51) Int. Cl.
*H04W 36/00* (2009.01)
(52) U.S. Cl.
CPC ... *H04W 36/0079* (2018.08); *H04W 36/0072* (2013.01)
(58) Field of Classification Search
CPC ........... H04W 36/185; H04W 36/0079; H04W 40/36; H04W 36/0072; H04W 36/305
See application file for complete search history.

(56) References Cited

U.S. PATENT DOCUMENTS

| | | | | |
|---|---|---|---|---|
| 2005/0067968 A1* | 3/2005 | Yamashita | ........... | G09G 3/3266 315/169.3 |
| 2023/0262565 A1* | 8/2023 | Chang | ................. | H04W 36/362 455/437 |

FOREIGN PATENT DOCUMENTS

| | | |
|---|---|---|
| CN | 111246499 A | 6/2020 |
| CN | 111328118 A | 6/2020 |

(Continued)

OTHER PUBLICATIONS

International Search Report and Written Opinion received in the corresponding International Application PCT/CN2021/124449, mailed Jan. 6, 2022.

*Primary Examiner* — Muhammad N Edun
(74) *Attorney, Agent, or Firm* — KILPATRICK TOWNSEND & STOCKTON LLP

(57) ABSTRACT

Provided in embodiments of the present disclosure are a method and apparatus for determining a DAPS handover failure type. The method includes receiving DAPS handover failure related information sent by a terminal; and determining a DAPS handover failure type on the basis of the DAPS handover failure related information. In the embodiments of the present disclosure, a DAPS handover failure type is determined on the basis of DAPS handover failure related information reported by a terminal, which is suitable for a situation in which both a source cell side connection and a target cell side connection may fail in a DAPS handover process, implementing mobility robustness optimization for a DAPS handover process, assisting network optimization, and improving the handover success rate.

18 Claims, 6 Drawing Sheets

(56) References Cited

FOREIGN PATENT DOCUMENTS

| | | |
|---|---|---|
| CN | 111386728 A | 7/2020 |
| WO | 2020210077 A1 | 10/2020 |

\* cited by examiner

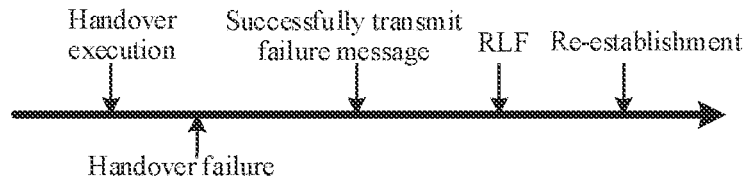
FIG. 12
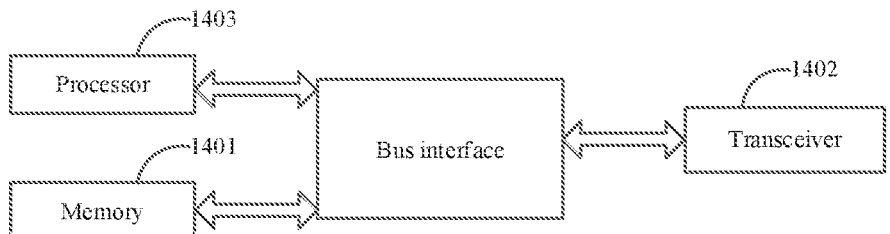
FIG. 13
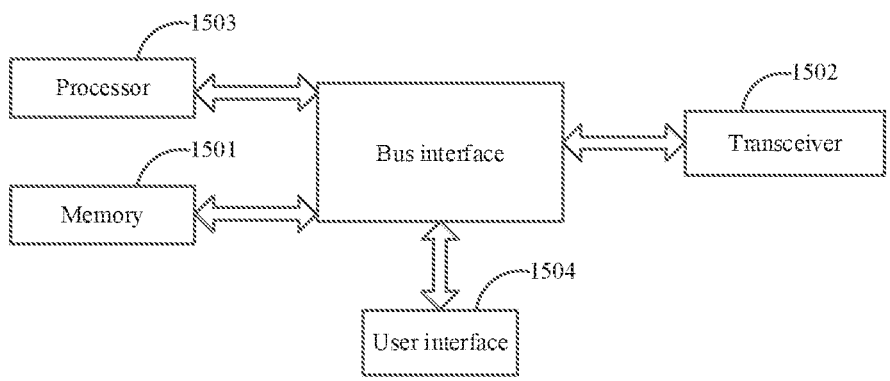
FIG. 14
FIG. 15
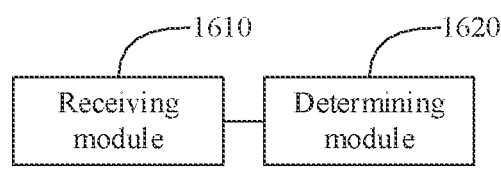
FIG. 16

METHOD AND APPARATUS FOR DETERMINING DAPS HANDOVER FAILURE TYPE

CROSS-REFERENCE TO RELATED APPLICATION

The present application is a national phase of International Application PCT/CN2021/124449, filed Oct. 18, 2021, which claims priority to Chinese Patent Application No. 202011133882.0, filed on Oct. 21, 2020, entitled "Method and Apparatus for Determining DAPS Handover Failure Type", which is hereby incorporated by reference in its entirety.

FIELD

The present application relates to the field of communication technologies, and in particular to methods and apparatuses for determining a type of DAPS handover failure.

BACKGROUND

Dual active protocol stack (DAPS) handover is an optimization of traditional handover and can reduce a delay caused by service interruption during handover. In a handover procedure, a terminal maintains a connection with a source gNB upon reception of a handover command and releases the source cell until successful random access to a target gNB. In a DAPS handover procedure, both a connection in source cell and a connection in target cell may fail. A traditional mobility robustness optimization (MRO) method for determining a type of a handover failure cannot be fully applicable to DAPS handover.

How to provide a method for determining a type of the handover failure applicable to DAPS handover has become an urgent problem to be solved.

SUMMARY

Embodiments of the present application provide methods and apparatuses for determining a type of a dual active protocol stack (DAPS) handover failure.

An embodiment of the present application provides a method for determining a type of a dual active protocol stack (DAPS) handover failure, applied to a network side device, including:
  receiving information associated with the DAPS handover failure transmitted by a terminal; and
  determining the type of the DAPS handover failure based on the information associated with the DAPS handover failure.

In an embodiment, the type of the DAPS handover failure includes any one of the following items: too early handover, too late handover, or handover to wrong cell;
  the determining the type of the DAPS handover failure includes:
    if determining that a connection failure of the terminal in a source cell, and a connection of the terminal in a target cell is successful or the terminal attempts to access another cell different from the source cell, determining the type of the DAPS handover failure to be too late handover;
    if determining that a connection failure of the terminal in a target cell, and the terminal successfully falls back to a source cell or initiates a re-establishment to attempt to access the source cell, determining the type of the DAPS handover failure to be too early handover; or
    if determining that connection failure of the terminal in a source cell and connection failure of the terminal in a target cell, and the terminal attempts to access another cell different from both the source cell and the target cell, determining the type of the DAPS handover failure to be handover to wrong cell.

In an embodiment, the if determining that the connection failure of the terminal in the source cell, and the connection of the terminal in the target cell is successful or the terminal attempts to access another cell different from the source cell, determining the type of the DAPS handover failure to be too late handover includes any one of:
  if determining that a radio link failure (RLF) occurs after the terminal has stayed for a period of time exceeding a first given period of time in the source cell, and the terminal initiates a radio resource control (RRC) connection re-establishment to attempt to access another cell different from the source cell, determining the type of the DAPS handover failure to be too late handover; or
  if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and a radio link failure (RLF) occurs in the source cell during the DAPS handover procedure, determining the type of the DAPS handover failure to be too late handover.

In an embodiment, the if determining that the connection failure of the terminal in the target cell, and the terminal successfully falls back to the source cell or initiates the re-establishment to attempt to access the source cell, determining the type of the DAPS handover failure to be too early handover includes any one of:
  if determining that during DAPS handover procedure the terminal successfully accesses to the target cell and a radio link failure (RLF) occurs within a first given period of time, and the terminal initiates a radio resource control (RRC) connection re-establishment to attempt to access the source cell, determining the type of the DAPS handover failure to be too early handover; or
  if determining that access failure of the terminal in the target cell during DAPS handover procedure and the terminal successfully falls back to the source cell, and no radio link failure (RLF) occurs within a second given period of time, determining the type of the DAPS handover failure to be too early handover.

In an embodiment, the if determining that connection failure of the terminal in the source cell and connection failure of the terminal in the target cell, and the terminal attempts to access another cell different from both the source cell and the target cell, determining the type of the DAPS handover failure to be handover to wrong cell includes any one of:
  if determining that a radio link failure (RLF) occurs in the source cell during DAPS handover procedure, and the terminal fails to access the target cell, and the terminal initiates a radio resource control (RRC) connection re-establishment to attempt to access another cell different from both the target cell and the source cell, determining the type of the DAPS handover failure to be handover to wrong cell;

if determining that the terminal successfully accesses to the target cell during DAPS handover procedure and a radio link failure (RLF) occurs within a first given period of time, and the terminal initiates a radio resource control (RRC) connection re-establishment to attempt to access another cell different from both the target cell and the source cell, determining the type of the DAPS handover failure to be handover to wrong cell;

if determining that after the terminal fails to access the target cell during DAPS handover procedure, the terminal fails to transmit a failure message in the source cell, a radio link failure (RLF) occurs in the source cell, and the terminal initiates a radio resource control (RRC) connection re-establishment to attempt to access another cell different from both the target cell and the source cell, determining the type of the DAPS handover failure to be handover to wrong cell; or if determining that after the terminal fails to access the target cell during DAPS handover procedure, a radio link failure (RLF) occurs in the source cell within a second given period of time after the terminal successfully transmits a failure message in the source cell, and the terminal initiates a radio resource control (RRC) connection re-establishment to attempt to access another cell different from both the target cell and the source cell, determining the type of the DAPS handover failure to be handover to wrong cell.

In an embodiment, the information associated with the DAPS handover failure includes information associated with a DAPS handover and at least one or any combination of the following items:
failure information;
a radio link failure (RLF) report; or
a handover success report;
where the information associated with the DAPS handover includes:
timer information at source cell side for DAPS handover and/or status indication information of source cell for DAPS handover;
indication information for successful or failed DAPS handover; and
DAPS handover indication information, used for determining that a handover is DAPS handover.

In an embodiment, the receiving information associated with the DAPS handover failure transmitted by the terminal includes:
receiving bearer information carrying the information associated with the DAPS handover, the bearer information including at least one or any combination of the following items:
failure information;
a radio link failure (RLF) report;
a handover success report; or
a given report, only used for carrying the information associated with the DAPS handover.

In an embodiment, the receiving information associated with the DAPS handover failure transmitted by the terminal includes:
receiving the information associated with the DAPS handover failure through a network interface, where the network interface includes at least one or any combination of the following items: an XN interface, an NG interface, an X2 interface, an S1 interface, an F1 interface or an E1 interface.

An embodiment of the present application provides a method for determining a type of a dual active protocol stack (DAPS) handover failure, applied to a terminal, including:
transmitting information associated with the DAPS handover failure, where the information associated with the DAPS handover failure is used for determining, by a network side device, the type of the DAPS handover failure.

In an embodiment, the information associated with the DAPS handover failure includes information associated with a DAPS handover and at least one or any combination of the following items:
failure information;
a radio link failure (RLF) report; or
a handover success report;
where the information associated with the DAPS handover includes:
timer information at source cell side for DAPS handover and/or status indication information of source cell for DAPS handover;
indication information for successful or failed DAPS handover; and
DAPS handover indication information, used for determining that a handover is DAPS handover.

In an embodiment, the transmitting information associated with the DAPS handover failure includes:
transmitting bearer information carrying the information associated with the DAPS handover, the bearer information including at least one or any combination of the following items:
failure information;
a radio link failure (RLF) report;
a handover success report; or
a given report, only used for carrying the information associated with the DAPS handover.

In an embodiment, the transmitting information associated with the DAPS handover failure includes:
transmitting the information associated with the DAPS handover failure through a network interface, where the network interface includes at least one or any combination of the following items: an XN interface, an NG interface, an X2 interface, an S1 interface, an F1 interface or an E1 interface.

An embodiment of the present application provides a network side device, including:
a processor,
a memory storing a computer program, and
a transceiver transmitting and receiving data under a control of the processor,
where the computer program, when executed by the processor, causes the processor to perform the following operations of:
receiving information associated with a dual active protocol stack (DAPS) handover failure transmitted by a terminal; and
determining a type of the DAPS handover failure based on the information associated with the DAPS handover failure.

In an embodiment, the type of the DAPS handover failure includes any one of the following items: too early handover, too late handover, or handover to wrong cell;
the determining the type of the DAPS handover failure includes:
if determining that a connection failure of the terminal in a source cell, and a connection of the terminal in a target cell is successful or the terminal attempts to access another cell different from the source cell, determining the type of the DAPS handover failure to be too late handover;

if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

In an embodiment, the if determining that the connection failure of the terminal in the source cell, and the connection of the terminal in the target cell is successful or the terminal attempts to access another cell different from the source cell, determining the type of the DAPS handover failure to be too late handover includes any one of:

if determining that a radio link failure (RLF) occurs after the terminal has stayed for a period of time exceeding a first given period of time in the source cell, and the terminal initiates a radio resource control (RRC) connection re-establishment to attempt to access another cell different from the source cell, determining the type of the DAPS handover failure to be too late handover; or if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and a radio link failure (RLF) occurs in the source cell during the DAPS handover procedure, determining the type of the DAPS handover failure to be too late handover.

In an embodiment, the if determining that the connection failure of the terminal in the target cell, and the terminal successfully falls back to the source cell or initiates the re-establishment to attempt to access the source cell, determining the type of the DAPS handover failure to be too early handover includes any one of:

if determining that during DAPS handover procedure the terminal successfully accesses to the target cell and a radio link failure (RLF) occurs within a first given period of time, and the terminal initiates a radio resource control (RRC) connection re-establishment to attempt to access the source cell, determining the type of the DAPS handover failure to be too early handover; or if determining that access failure of the terminal in the target cell during DAPS handover procedure and the terminal successfully falls back to the source cell, and no radio link failure (RLF) occurs within a second given period of time, determining the type of the DAPS handover failure to be too early handover.

In an embodiment, the if determining that connection failure of the terminal in the source cell and connection failure of the terminal in the target cell, and the terminal attempts to access another cell different from both the source cell and the target cell, determining the type of the DAPS handover failure to be handover to wrong cell includes any one of:

if determining that a radio link failure (RLF) occurs in the source cell during a DAPS handover procedure, and the terminal fails to access the target cell, and the terminal initiates a radio resource control (RRC) connection re-establishment to attempt to access another cell different from both the target cell and the source cell, determining the type of the DAPS handover failure to be handover to wrong cell;

if determining that the terminal successfully accesses to the target cell during DAPS handover procedure and a radio link failure (RLF) occurs within a first given period of time, and the terminal initiates a radio resource control (RRC) connection re-establishment to attempt to access another cell different from both the target cell and the source cell, determining the type of the DAPS handover failure to be handover to wrong cell;

if determining that after the terminal fails to access the target cell during DAPS handover procedure, the terminal fails to transmit a failure message in the source cell, a radio link failure (RLF) occurs in the source cell, and the terminal initiates a radio resource control (RRC) connection re-establishment to attempt to access another cell different from both the target cell and the source cell, determining the type of the DAPS handover failure to be handover to wrong cell; or if determining that after the terminal fails to access the target cell during DAPS handover procedure, a radio link failure (RLF) occurs in the source cell within a second given period of time after the terminal successfully transmits a failure message in the source cell, and the terminal initiates a radio resource control (RRC) connection re-establishment to attempt to access another cell different from both the target cell and the source cell, determining the type of the DAPS handover failure to be handover to wrong cell.

In an embodiment, the information associated with the DAPS handover failure includes information associated with a DAPS handover and at least one or any combination of the following items:

failure information;

a radio link failure (RLF) report; or a handover success report;

where the information associated with the DAPS handover includes:

timer information at source cell side for DAPS handover and/or status indication information of source cell for DAPS handover;

indication information for successful or failed DAPS handover; and

DAPS handover indication information, used for determining that a handover is DAPS handover.

In an embodiment, the receiving information associated with the DAPS handover failure transmitted by the terminal includes:

receiving bearer information carrying the information associated with the DAPS handover, the bearer information including at least one or any combination of the following items:

failure information;

a radio link failure (RLF) report;

a handover success report; or a given report, only used for carrying the information associated with DAPS handover.

In an embodiment, the receiving information associated with the DAPS handover failure transmitted by the terminal includes:

receiving the information associated with the DAPS handover failure through a network interface, where the network interface includes at least one or any combination of the following items: an XN interface, an NG interface, an X2 interface, an S1 interface, an F1 interface or an E1 interface.

An embodiment of the present application provides a terminal, including:
a processor,
a memory storing a computer program, and
a transceiver transmitting and receiving data under a control of the processor,
where the computer program, when executed by the processor, causes the processor to perform the following operation of:
transmitting information associated with a dual active protocol stack (DAPS) handover failure, where the information associated with the DAPS handover failure is used for determining, by a network side device, a type of the DAPS handover failure.

In an embodiment, the information associated with the DAPS handover failure includes information associated with a DAPS handover and at least one or any combination of the following items:
failure information;
a radio link failure (RLF) report; or
a handover success report;
where the information associated with the DAPS handover includes:
timer information at source cell side for DAPS handover and/or status indication information of source cell for DAPS handover;
indication information for successful or failed DAPS handover; and
DAPS handover indication information, used for determining that a handover is DAPS handover.

In an embodiment, the transmitting information associated with the DAPS handover failure includes:
transmitting bearer information carrying the information associated with the DAPS handover, the bearer information including at least one or any combination of the following items:
failure information;
a radio link failure (RLF) report;
a handover success report; or
a given report, only used for carrying the information associated with the DAPS handover.

In an embodiment, the transmitting information associated with the DAPS handover failure includes:
transmitting the information associated with the DAPS handover failure through a network interface, where the network interface includes at least one or any combination of the following items: an XN interface, an NG interface, an X2 interface, an S1 interface, an F1 interface or an E1 interface.

An embodiment of the present application provides an apparatus for determining a type of a dual active protocol stack (DAPS) handover failure, including:
a receiving module, used for receiving information associated with the DAPS handover failure transmitted by a terminal; and
a determining module, used for determining the type of the DAPS handover failure based on the information associated with the DAPS handover failure.

An embodiment of the present application provides an apparatus for determining a type of a dual active protocol stack (DAPS) handover failure, including:
a transmitting module, used for transmitting information associated with the DAPS handover failure, where the information associated with the DAPS handover failure is used for determining, by a network side device, the type of the DAPS handover failure.

An embodiment of the present application provides a non-transitory computer readable storage medium storing computer programs that cause, when executed by a processor, the processor to perform any of the above methods.

In the methods and apparatuses for determining the type of the DAPS handover failure according to embodiments of the present application, the type of the DAPS handover failure can be determined based on the information associated with the DAPS handover failure reported by the terminal, which is applicable to the situation that both the connection in source cell and the connection in target cell may fail during DAPS handover procedure, can achieve a mobility robustness optimization in DAPS handover procedure, assist network optimization and improve handover success rate.

BRIEF DESCRIPTION OF DRAWINGS

In order to more clearly illustrate the solutions of the embodiments according to the present application or the related art, the accompanying drawings used in the description of the embodiments or the related art are briefly introduced below. It should be noted that the drawings in the following description are only some embodiments of the present application.

FIG. 12 is an eighth schematic flow diagram of a method for determining a type of a DAPS handover failure according to an embodiment of the present application;

FIG. 13 is a ninth schematic flow diagram of a method for determining a type of a DAPS handover failure according to an embodiment of the present application;

FIG. 14 is a schematic structural diagram of a network side device according to an embodiment of the present application;

FIG. 15 is a schematic structural diagram of a terminal according to an embodiment of the present application;

FIG. 16 is a schematic structural diagram of an apparatus for determining a type of a DAPS handover failure according to an embodiment of the present application.

DETAILED DESCRIPTION OF THE EMBODIMENTS

Figure 1:
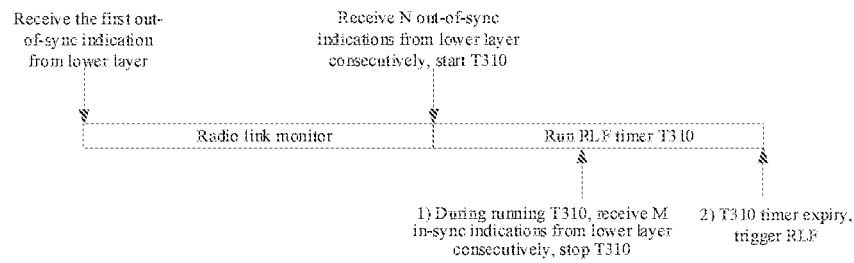
FIG. 1 is a schematic diagram of radio link failure according to an embodiment of the present application.

The term "and/or" in the embodiments of the present application describes three situations of the related objects. For example, A and/or B can represent three situations: only A, A and B together, and only B. The character "/" generally represents that the two objects on two sides have a relationship of "or".

The term "multiple" in the embodiments of the present application refers to two or more, and other quantifiers are similar to it.

The solutions according to the present application are clearly described below in combination with the accompanying drawings in the embodiments of the present application. It should be noted that the described embodiments are some embodiments of the present application, rather than all the embodiments.

Embodiments of the present application provide methods and apparatuses for determining a type of a dual active protocol stack (DAPS) handover failure, which solves a problem that both a connection in source cell and a connection in target cell may fail during DAPS handover procedure. The traditional mobility robustness optimization (MRO) method for determining the type of the handover failure cannot be fully applicable to this problem of DAPS handover. The methods and apparatuses for determining the type of the DAPS handover failure according to the embodiments of the present application are applicable to DAPS handover, can achieve a mobility robustness optimization in DAPS handover procedure, assist network optimization and improve handover success rate.

The methods and the apparatuses are based on the same conception. Since the principles of the methods and the apparatuses to solve the problems are similar, the implementation of the apparatuses and methods can be referred to each other, and the similar part is not repeated.

In order to facilitate describing the embodiments of the present application, the following items are first introduced.
1) Dual Active Protocol Stack (DAPS) Handover DAPS handover is an optimization of traditional handover and can reduce a delay caused by service interruption during handover. In a handover procedure, a terminal maintains a connection with a source gNB upon reception of a handover command and releases the source cell until successful random access to a target gNB. In a DAPS handover procedure, both a connection in source cell and a connection in target cell may fail. The definition of a type of handover failure in traditional mobility robustness optimization (MRO) cannot be fully applicable to DAPS handover. The present application redefines a type of the DAPS handover failure, analyzes the failure types in various DAPS handover failure scenarios, and assists the network in performing MRO.

2) Radio Link Failure (RLF)

The radio link failure in a new radio (NR) system may be caused by several reasons as follows.

A) T310 timer expiry: For example, in case that a radio resource control (RRC) layer of a user equipment (UE) detects a physical layer problem, the timer T310 is started; and while the timer T310 is running, if the radio link recovers, the timer T310 is stopped, otherwise the timer T310 will continue to run. In case that the timer T310 is at expiry, it can be regarded as radio link failure.

B) T312 timer expiry: For example, T312 timer is started when a UE starts to establish a dedicated channel, and the T312 timer is stopped in case that the UE detects N312 consecutive in-sync indications from L1. Once the expiry occurs, the establishment of physical channel fails.

C) Under a certain condition, media access control address (MAC) reports random access problems, including a beam failure recovery failure and a random access problem.

D) Under a certain condition, radio link control (RLC) reports that for signaling radio bearers (SRB) or data radio bearers (DRB), the maximum number of retransmissions is reached.

E) Consecutive listen before talk (LBT) failures under a certain condition.

FIG. 1 is a schematic diagram of radio link failure according to an embodiment of the present application. As shown in FIG. 1, it is a radio link failure caused by T310 expiry. For the T310 expiry, in case that RRC of a UE consecutively receives N out-of-sync indications from lower layer, the RLF timer T310 is started, where a value of N can be a value of N310. In case that M in-sync indications are consecutively received during running of T310, it is considered that the out-of-sync problem is solved and the T310 timer is stopped, where a value of M can be a value of N311.

In case that the M (such as the value of N311) in-sync indications cannot be consecutively received during running of T310, this finally lead to T310 timer expiry, which can be considered as that the radio link cannot be maintained and the radio link failure occurs. Subsequently, based on a given condition, the UE may select a new cell to initiate a re-establishment process or enter an idle status.

3) RLF Report

RLF report is a report recorded at terminal side, mainly including two recording scenarios: handover failure and radio link failure. One RLF report can only represent a record of one scenario.

RLF report includes:
1. a measurement result of a serving cell corresponding to the terminal;
2. a measurement result of a neighbor cell after the terminal confirms handover failure or radio link failure;
3. terminal location information;
4. identity information of a cell where a failure occurs on the terminal, such as cell global identity (CGI)/physical cell identity (PCI) and frequency point;
5. identity information of a cell where a re-establishment for the terminal took place;
6. a period of time elapsed from lastly reception of a handover command message to a connection failure;
7. a cause of connection failure, such as handover failure or radio link failure;
8. a cell-radio network temporary identifier (C-RNTI) used by the terminal in case of connection failure;

9. a sub-cause of radio link failure, such as T310 expiry, or random access problem, or RLC layer reaching maximum retransmission, or beam failure recovery failure (BFRF);
10. a period of time elapsed from the terminal confirms a connection failure to the terminal reports the RLF report;
11. a tracking area code (TAC) of a cell where a connection failure occurs;
12. related record results of blue tooth (BT); and
13. wireless local area network (WLAN).

4) Common Handover Process

Figure 2:
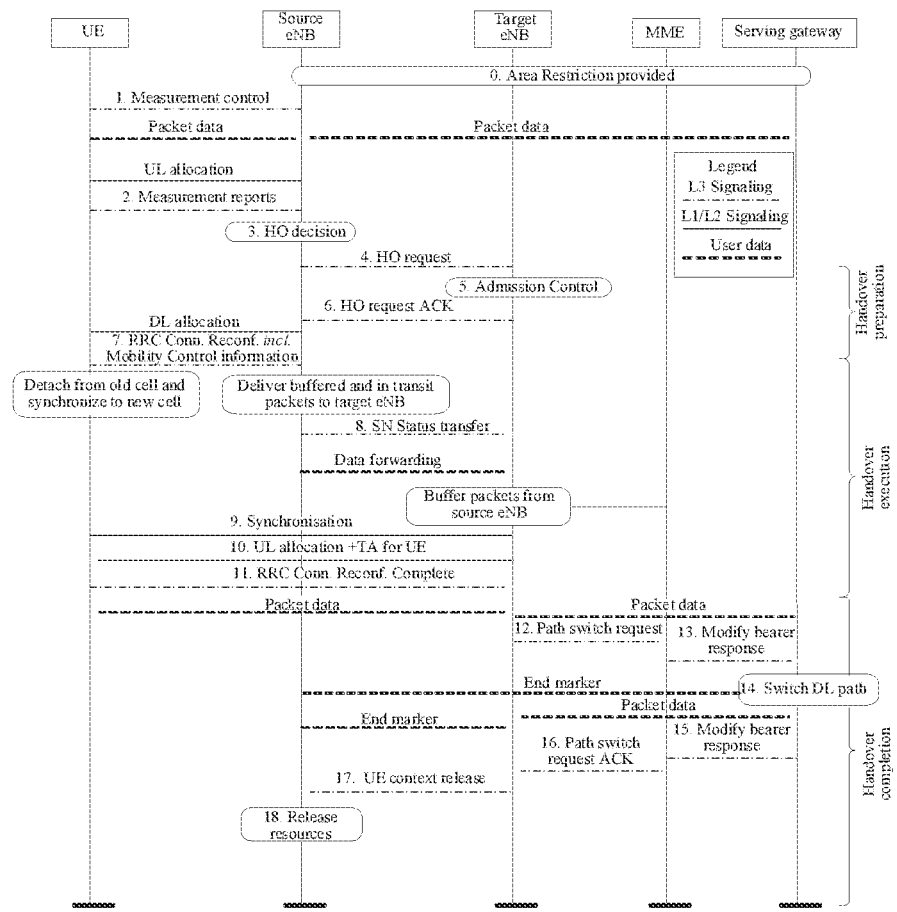
FIG. 2 is a schematic flow diagram of a handover procedure according to an embodiment of the present application.

FIG. 2 is a schematic flow diagram of a handover procedure according to an embodiment of the present application. For the handover procedure shown in FIG. 2, data transmission at a source cell side is interrupted first, and then service transmission is continued after accessing a target node, which results in large data interruption.

5) DAPS Handover Procedure

Figure 3:
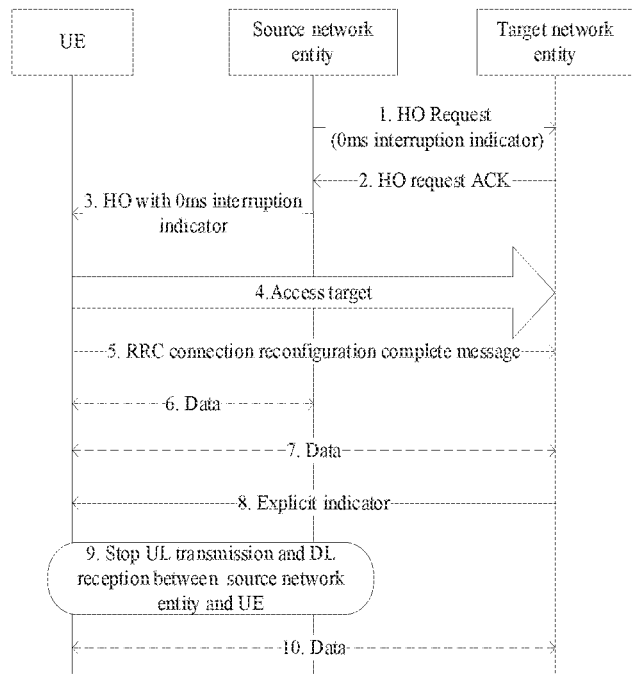
FIG. 3 is a schematic flow diagram of a dual active protocol stack (DAPS) handover according to an embodiment of the present application.

FIG. 3 is a schematic flow diagram of the dual active protocol stack (DAPS) handover procedure according to an embodiment of the present application. As shown in FIG. 3, the DAPS handover procedure is as follows:

step 1: an old data transmission link is maintained between a source network entity (NR gNB or ng-eNB) and a UE, and the source network entity (NR gNB or ng-eNB) transmits a handover request (HO request) (Oms interruption indicator) to a target network entity (NR gNB or ng-eNB);

step 2: the target network entity (NR gNB or ng-eNB) feeds back a handover request acknowledge (HO request ACK) to the source network entity (Source eNB);

step 3: the source network entity (Source eNB) transmits a handover (HO) indication with Oms interruption indicator to the UE;

step 4: the UE accesses the target network entity (NR gNB or ng-eNB) according to the handover indication, that is, accesses a target;

step 5: the UE transmits an RRC connection reconfiguration complete message to the target network entity (NR gNB or ng-eNB); after receiving the Oms interruption indicator transmitted by the source network entity (NR gNB or ng-eNB) and the RRC connection reconfiguration complete message from the UE, in case that a downlink packet data convergence protocol (PDCP) data packet or a control frame to be transmitted is in buffer, the target network entity (NR gNB or ng-eNB) transmits it to the UE through a new link, where the downlink PDCP data packet includes data from new security context through encryption or integrity processing;

step 6: transmission and reception of user data are maintained between the UE and the source network entity (Source eNB);

step 7: transmission and reception of user data are maintained between the UE and the target network entity (NR gNB or ng-eNB);

step 8: the target network entity (NR gNB or ng-eNB) transmits an explicit indicator to the UE to notify the UE of completing the data transmission, and expects the UE to release the data connection between the source network entity (NR gNB or ng-eNB) and the UE;

step 9: the UE stops the uplink (UL) transmission and downlink (DL) reception between the source network entity (NR gNB or ng-eNB) and the UE, and starts to release multipurpose clock generator (MCG) configuration at the entire source cell side; and step 10: transmission and reception of user data are only maintained between the UE and the target network entity (NR gNB or ng-eNB).

5) Introduction of Mobility Robustness Optimization (MRO)

MRO is mainly used to solve the failure problem in the process of terminal mobility and assist network optimization. In case of handover failure or radio link failure (RLF), the terminal measures a frequency point configured for measurement and records the measurement result. The terminal also records other relevant information, such as random access, handover and re-establishment, etc. After the handover failure, the terminal selects the cells, and then re-accesses network side device through RRC connection re-establishment or RRC connection establishment, and notifies the network side that information of radio link failure or handover failure has been reserved at the terminal side device. The network side device obtains the information from the terminal when necessary to assist network optimization at the network side device.

MRO is mainly used to discover and solve a problem of parameter configuration in the mobility process, and defines three types of failure: too early handover, too late handover, and handover to wrong cell.

Too late handover: an RLF occurs after the terminal has stayed in the source cell for a period of time, and the terminal attempts to access a different cell through RRC connection re-establishment.

Too early handover: the terminal fails to access the target cell, or an RLF occurs shortly after a successful access to the target cell during the handover procedure, and the terminal attempts to access the source cell through RRC connection re-establishment.

Handover to wrong cell: the terminal fails to access the target cell, or an RLF occurs shortly after a successful access to the target cell during the handover procedure, and the terminal attempts to access another cell different from both the target cell and the source cell through RRC connection re-establishment.

In NR MRO, the mobility robustness can be enhanced by reporting failure events observed during successful handover process. For example, a UE collects the information associated with the handover procedure and reports it to the network side device as a report of successful handover.

6) DAPS Handover Failure Procedure

Figure 4:
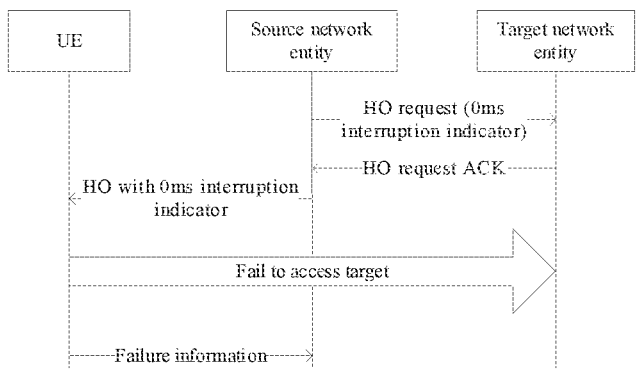
FIG. 4 is a schematic flow diagram of a DAPS handover failure according to an embodiment of the present application.

FIG. 4 is a schematic flow diagram of DAPS handover failure procedure according to an embodiment of the present application. As shown in FIG. 4, DAPS handover is added in protocol version of R16, where after receiving a handover command, the terminal does not release the connection in source cell, and at the same time, performs random access to target network.

In case that the random access to a target gNB fails and a radio link failure occurs at source gNB, the terminal cannot transmit a failure message at the source gNB. The subsequent procedure is similar to traditional handover, for example, to select a cell and then re-establish or re-access. Since the subsequent procedure is similar to the traditional handover, related functions of MRO can use traditional mechanism.

In case that the random access to the target gNB fails but no RLF occurs at source cell side during DAPS handover procedure, the terminal recovers the connection with the source gNB, and reports DAPS handover failure through the failure information message at the source gNB.

In R16 protocol version, during DAPS handover procedure, the terminal maintains both a connection in source cell and a connection in target cell, and both the connection in source cell and the connection in target cell may fail. A connection failure occurred in either side may decrease the performance of DAPS handover, which needs to be optimized. The traditional MRO method is not applicable for optimizing the source cell side and the target cell side simultaneously. There is a need to provide a method for determining a type of a DAPS handover failure, collect the failure information related to the handover at the source cell side and the target cell side during handover procedure, analyze the types of the DAPS handover failures in various DAPS handover failure scenarios, and assist the network in optimizing the DAPS handover parameters.

The present application is described in detail in combination with multiple embodiments below.

Figure 5:
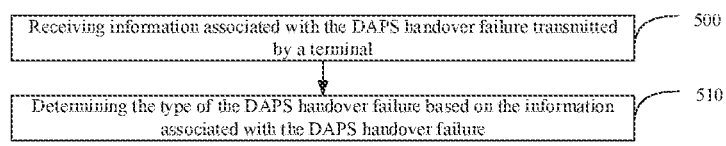
FIG. 5 is a first schematic flow diagram of a method for determining a type of a DAPS handover failure according to an embodiment of the present application.

FIG. 5 is a first schematic flow diagram of a method for determining a type of a dual active protocol stack (DAPS) handover failure according to an embodiment of the present application. As shown in FIG. 5, the method is applied to a network side device, including the following steps.

Step 500: receiving information associated with the DAPS handover failure transmitted by a terminal.

In an embodiment, in order to determine DAPS handover failure type and complete DAPS optimization by the network side device, the terminal can collect the information associated with the DAPS handover failure and upload it to the network side device.

After triggering a traditional handover, the terminal releases the connection with the source cell. However, during DAPS handover, the terminal maintains the source cell connection. In an embodiment, for analyzing the type of the DAPS handover failure, information at the source cell side can be recorded. For example, in order to adapt to the scenario of DAPS handover where a connection failure may occur at both the target cell side and the source cell side, information associated with the DAPS handover failure collected and transmitted by the terminal to the network side can include the information at the source cell side and the target cell side for the DAPS handover.

Step 510: determining the type of the DAPS handover failure based on the information associated with the DAPS handover failure.

In an embodiment, after receiving the information associated with the DAPS handover failure, the network side device can determine connection statuses of the terminal at the source cell side and the target cell side based on the information associated with the DAPS handover failure, and then determine the type of the DAPS handover failure.

In the method for determining the type of the DAPS handover failure according to the embodiments of the present application, the type of the DAPS handover failure can be determined based on the information associated with the DAPS handover failure reported by the terminal, which is applicable to the situation that the connection in source cell and the connection in target cell may fail during DAPS handover procedure, which can achieve a mobility robustness optimization in DAPS handover procedure, assist network optimization and improve handover success rate.

In an embodiment, based on any of the above embodiments, the type of the DAPS handover failure includes any one of: too early handover, too late handover, or handover to wrong cell;

the determining the type of the DAPS handover failure includes:

if determining that a connection failure of the terminal in a source cell, and a connection of the terminal in a target cell is successful or the terminal attempts to access another cell different from the source cell, determining the type of the DAPS handover failure to be too late handover;

if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

For example, the network side device can determine the type of the DAPS handover failure to be too early handover, or too late handover, or handover to wrong cell.

In an embodiment, in case that the network side device determines that the connection failure of the terminal in the source cell, and the connection of the terminal in the target cell is successful or the terminal attempts to access another cell different from the source cell, the network side device determines the type of the DAPS handover failure to be too late handover.

Figure 6:
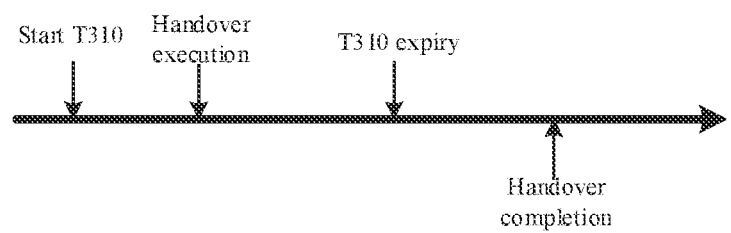
FIG. 6 is a second schematic flow diagram of a method for determining a type of a DAPS handover failure according to an embodiment of the present application.

For example, FIG. 6 is a second schematic flow diagram of a method for determining a type of a DAPS handover failure according to an embodiment of the present application. As shown in FIG. 6, the terminal successfully accesses the target cell during the DAPS handover procedure, but T310 expiry occurs at the source cell side during the DAPS handover procedure, a radio link failure (RLF) occurs in the source cell side, and thus the type of the DAPS handover failure can be determined to be too late handover.

In an embodiment, in case that an RLF occurs in the source cell side, information associated with the RLF can be recorded by the terminal, the terminal can place the recorded information in a handover success report or an RLF report, or take it as a new report separately, and transmit it to the network side device as the information associated with the DAPS handover failure.

The network side device analyzes the information associated with the DAPS handover failure reported by the terminal, and determines that the handover of the terminal is successful based on indication information for successful or failed DAPS handover, that is, the random access to the target cell is successful. At the same time, the network side device determines that the terminal has stably stayed in the target cell based on the information in the RLF report, such as a period of time elapsed from lastly reception of a handover command message to a connection failure, and determines that an RLF for the terminal occurs in source cell based on timer information at source cell side for DAPS handover and/or status indication information of source cell for DAPS handover, and then determines the type of the DAPS handover failure to be too late handover, or it is a critical success handover, i.e. too late handover.

In an embodiment, in case that the network side device determines that the connection failure of the terminal in the target cell, and the terminal successfully falls back to the source cell or the terminal initiates a re-establishment to attempt to access the source cell, the type of the DAPS handover failure is determined to be too early handover.

Figure 7:
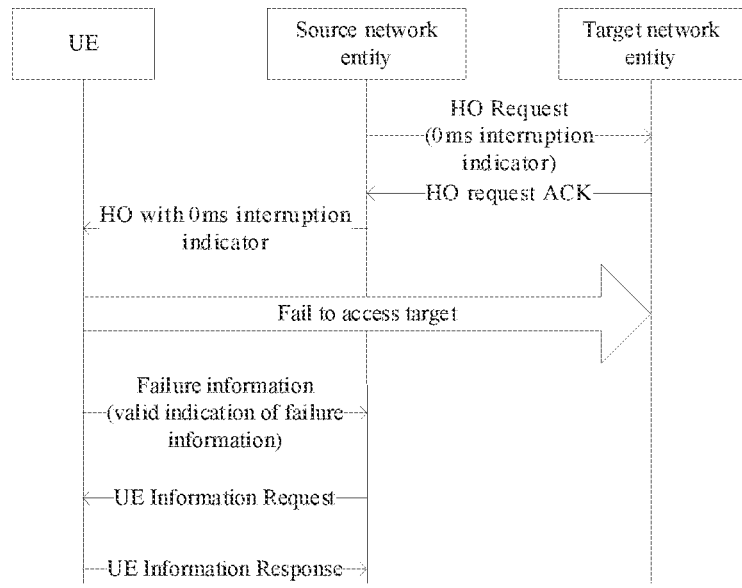
FIG. 7 is a third schematic flow diagram of a method for determining a type of a DAPS handover failure according to an embodiment of the present application.

For example, FIG. 7 is a third schematic flow diagram of a method for determining a type of a DAPS handover failure according to an embodiment of the present application. As shown in FIG. 7, in case that the terminal fails to handover to the target cell during the DAPS handover procedure and the terminal has stably stayed in the source cell, it can be determined the type of the DAPS handover failure to be too early handover.

In an embodiment, in case that the terminal fails to handover to the target cell, the terminal can record the information associated with the RLF, this information can be placed in failure information and be transmitted to the network side as the information associated with the DAPS handover failure, or can be placed in RLF report and be transmitted to the network side as the information associated with the DAPS handover failure, or can be taken as a new report separately and be transmitted to the network side as the information associated with the DAPS handover failure, and thus the network side can analyze the causes of the failure and optimize the network.

The network side device analyzes the information associated with the DAPS handover failure reported by the terminal, determines that the handover of the terminal at the target cell side is failed based on indication information for successful or failed DAPS handover, and determines that the terminal is able to stably stay in the source cell based on timer information at source cell side for DAPS handover and/or status indication information of source cell for DAPS handover, and the information in the RLF report, such as a period of time elapsed from lastly reception of a handover command message to a connection failure, and then determines the type of the DAPS handover failure to be too early handover.

In an embodiment, in case that the network side device determines that connection failure of the terminal in the source cell and connection failure of the terminal in the target cell, and the terminal attempts to access another cell different from both the source cell and the target cell, the type of the DAPS handover failure can be determined to be handover to wrong cell.

Figure 8:
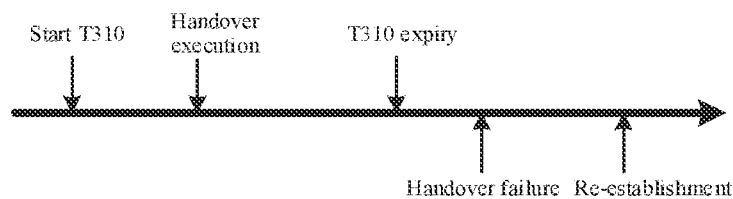
FIG. 8 is a fourth schematic flow diagram of a method for determining a type of a DAPS handover failure according to an embodiment of the present application.

For example, FIG. 8 is a fourth schematic flow diagram of a method for determining a type of a DAPS handover failure according to an embodiment of the present application. As shown in FIG. 8, in case that during the DAPS handover procedure for the terminal, T310 expires in source cell, which results in an RLF, and the random access of the terminal to target cell fails, and the terminal attempts to access another cell different from both the source cell and the target cell, the type of the DAPS handover failure can be determined to handover to wrong cell.

In case that an RLF for the terminal occurs in source cell, the information associated with RLF can be recorded by the terminal, and the terminal can place it in a handover success report, or an RLF report, or a given report and transmit it to the network side as the information associated with the DAPS handover failure. In case that the random access of the terminal to target cell fails, the terminal can record the failure information in the RLF report and report it to the network side as the information associated with the DAPS handover failure. In the present embodiment, the failure information and the failure information of the source cell can be placed in the same RLF report or different reports to transmit to the network side respectively, and thus the network side can analyze the causes of the failure and optimize the network.

After receiving the information associated with the DAPS handover failure, such as the failure information of the source cell and RLF report generated after failing to access the target cell, the network side can analyze them simultaneously. The network side can determine the connection failure of the terminal in both source cell and the target cell during the handover procedure based on timer information at source cell side for DAPS handover and/or status indication information of source cell for DAPS handover, and indication information for successful or failed DAPS handover, and then the type of the DAPS handover failure in this scenario can be determined to be handover to wrong cell.

In an embodiment, based on any of the above embodiments, the if determining that the connection failure of the terminal in the source cell, and the connection of the terminal in the target cell is successful or the terminal attempts to access another cell different from the source cell, and then determining the type of the DAPS handover failure to be too late handover includes any one of:

if determining that an RLF occurs after the terminal has stayed for a period of time exceeding a first given period of time in the source cell, and the terminal initiates an RRC connection re-establishment to attempt to access another cell different from the source cell, determining the type of the DAPS handover failure to be too late handover; or if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and an RLF occurs in the source cell during the DAPS handover procedure, determining the type of the DAPS handover failure to be too late handover.

In an embodiment, in case that the network side device determines that an RLF occurs after the terminal has stayed for a period of time exceeding the first given period of time in the source cell, and the terminal initiates an RRC connection re-establishment to attempt to access another cell different from the source cell based on the information associated with the DAPS handover failure, the network side device determines the type of the DAPS handover failure to be too late handover.

For example, in case that an RLF occurs after the terminal has stably stayed for a period of time in the source cell, and the terminal initiates an RRC connection re-establishment to attempt to access another cell, the type of the DAPS handover failure can be determined to be too late handover. After the RLF occurs in the source cell, the terminal can collect the information associated with the DAPS handover failure and transmit it to the network side. After receiving the information associated with the DAPS handover failure, the network side can determine the type of the DAPS handover failure to be too late handover based on the information associated with the DAPS handover failure.

In an embodiment, based on any of the above embodiments, the if determining that the connection failure of the terminal in the target cell, and the terminal successfully falls back to the source cell or initiates the re-establishment to attempt to access the source cell, determining the type of the DAPS handover failure to be too early handover includes any one of:

if determining that during DAPS handover procedure the terminal successfully accesses to the target cell and a radio link failure (RLF) occurs within a first given period of time, and the terminal initiates a radio resource control (RRC) connection re-establishment to attempt to access the source cell, determining the type of the DAPS handover failure to be too early handover; or if determining that access failure of the terminal in the target cell during DAPS handover procedure and the terminal successfully falls back to the source cell, and no radio link failure (RLF) occurs within a second given period of time, determining the type of the DAPS handover failure to be too early handover.

Figure 9:
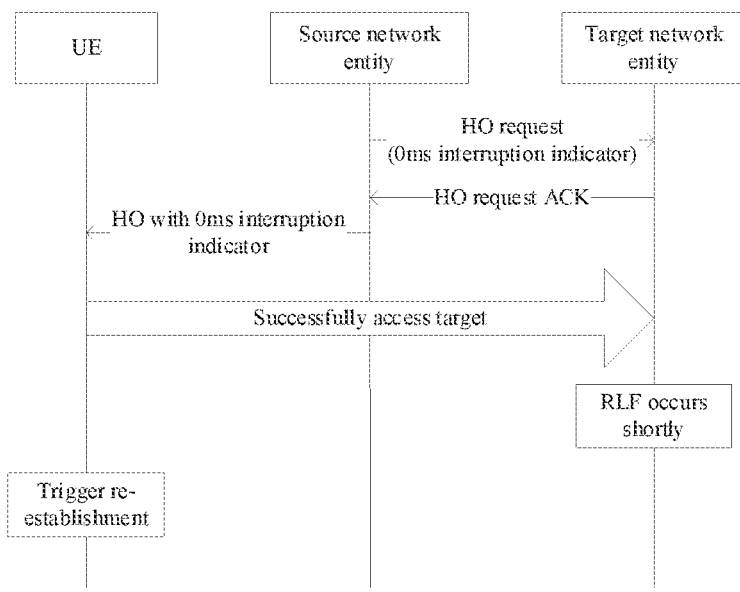
FIG. 9 is a fifth schematic flow diagram of a method for determining a type of a DAPS handover failure according to an embodiment of the present application.

For example, FIG. 9 is a fifth schematic flow diagram of a method for determining a type of a DAPS handover failure according to an embodiment of the present application. As shown in FIG. 9, in case that the network side device determines that during DAPS handover procedure the terminal successfully accesses to the target cell and an RLF occurs within a first given period of time, and the terminal initiates an RRC connection re-establishment to attempt to access the source cell based on the information associated with DAPS handover failure, the type of the DAPS handover failure can be determined to be too early handover.

For example, in case that an RLF occurs in the target cell shortly after a DAPS handover is completed and the terminal initiates the RRC connection re-establishment to attempt to access the source cell, the terminal can record information associated with the RLF to form an RLF report, and transmit it to the network side as the information associated with the DAPS handover failure;

after receiving the information associated with the DAPS handover failure, the network side can determine, based on an indication information for successful or failed DAPS handover in the RLF report and the RLF report, that the handover is successful in the target cell but a failure occurs shortly, and determines, in combination with timer information at source cell side for DAPS handover and/or the status indication information of source cell for DAPS handover, association information for the terminal initiates the RRC connection re-establishment to attempt to access the source cell, and then determines the type of the DAPS handover failure to be too early handover.

It should be noted that the terminal does not detect the RLF in the source cell after the random access is successful, and thus the DAPS handover in this scenario is the same as the traditional handover.

It should be noted that in embodiments of the present application, the first given period of time and the second given period of time may be the same or different, which is not limited in the present application.

In an embodiment, in case that the network side device determines, based on the information associated with the DAPS handover failure, that access failure of the terminal in the target cell during DAPS handover procedure and the terminal successfully falls back to the source cell and no RLF occurs within a second given period of time, the network side device determines the type of the DAPS handover failure to be too early handover.

For example, in case that during DAPS handover, the terminal fails to handover to the target cell, but the terminal stably stays in the source cell, it can be determined the type of the DAPS handover failure to be too early handover.

In cased that the terminal fails to handover to the target cell, the terminal can record information associated with the RLF, and the information associated with the RLF can be placed in failure information and transmitted to the network side as the information associated with the DAPS handover failure, or the information associated with the RLF can be placed in an RLF report and transmitted to the network side as the information associated with the DAPS handover failure, or the information associated with the RLF can be taken as a given report and transmitted to the network side as the information associated with DAPS handover failure, and then the network side can analyze causes of failure and optimize the network.

The network side device analyzes the information associated with the DAPS handover failure reported by the terminal, and can determine that the access failure of the terminal in the target cell based on the information associated with the DAPS handover failure, and can determine that the terminal is stably stayed in the source cell based on timer information at source cell side for DAPS handover and/or status indication information of source cell for DAPS handover and a period of time elapsed from lastly reception of a handover command message to a connection failure in an RLF report, and then determine the type of the DAPS handover failure to be too early handover.

In an embodiment, based on any of the above embodiments, the if determining that connection failure of the terminal in the source cell and connection failure of the terminal in the target cell, and the terminal attempts to access another cell different from both the source cell and the target cell, and then determining the type of the DAPS handover failure to be handover to wrong cell includes any one of:

if determining that a radio link failure (RLF) occurs in the source cell during DAPS handover procedure, and the terminal fails to access the target cell, and the terminal initiates a radio resource control (RRC) connection re-establishment to attempt to access another cell different from both the target cell and the source cell, determining the type of the DAPS handover failure to be handover to wrong cell;

if determining that the terminal successfully accesses to the target cell during DAPS handover procedure and a radio link failure (RLF) occurs within a first given period of time, and the terminal initiates a radio resource control (RRC) connection re-establishment to attempt to access another cell different from both the target cell and the source cell, determining the type of the DAPS handover failure to be handover to wrong cell;

if determining that after the terminal fails to access the target cell during DAPS handover procedure, the terminal fails to transmit a failure message in the source cell, a radio link failure (RLF) occurs in the source cell, and the terminal initiates a radio resource control (RRC) connection re-establishment to attempt to access another cell different from both the target cell and the source cell, determining the type of the DAPS handover failure to be handover to wrong cell; or if determining that after the terminal fails to access the target cell during DAPS handover procedure, a radio link failure (RLF) occurs in the source cell within a second given period of time after the terminal successfully transmits a failure message in the source cell, and the terminal initiates a radio resource control (RRC) connection re-establishment to attempt to access another cell different from both the target cell and the source cell, determining the type of the DAPS handover failure to be handover to wrong cell.

In an embodiment, in case that the network side device determines, based on the information associated with the DAPS handover failure, that an RLF occurs in the source cell during DAPS handover procedure, and the terminal fails to access the target cell and the terminal initiates an RRC connection re-establishment to attempt to access another cell different from both the source cell and the target cell, the type of the DAPS handover failure can be determined to be handover to wrong cell.

For example, in case that during DAPS handover procedure, T310 expires in the source cell, which results in an RLF for the terminal, and the random access of the terminal to the target cell is failed, and the terminal attempts to access another cell different from both the source cell and the target cell, the type of the DAPS handover failure can be determined to be handover to wrong cell.

In case that the RLF occurs in the source cell, the terminal can record the information associated with the RLF, place it in a handover success report, or an RLF report, or a given report, and report it to the network side as the information associated with the DAPS handover failure. In case that the random access of the terminal to the target cell fails, the terminal can record failure information in the RLF report, and also report it to the network side as the information associated with the DAPS handover failure. In the present embodiment, the failure information and the failure information of the source cell can be placed in the same RLF report or different reports to transmit to the network side respectively, and thus the network side can analyze the causes of the failure and optimize the network.

After receiving the information associated with the DAPS handover failure, such as the failure information of the source cell and the RLF report indicating that the access to the target cell is failed, the network side can analyze them simultaneously, and can determine that the connections of the terminal in both the source cell and the target cell during the DAPS handover procedure are failed based on the timer information at source cell side for DAPS handover and/or the status indication information of source cell for DAPS handover, and the indication information for successful or failed DAPS handover, and then determine the type of the DAPS handover failure to be handover to wrong cell in this scenario.

In an embodiment, in case that the network side device determines, based on the information associated with the DAPS handover failure, that the terminal successfully accesses to the target cell during DAPS handover procedure and an RLF occurs within a first given period of time, and the terminal initiates an RRC connection re-establishment to attempt to access another cell different from both the target cell and the source cell, the type of the DAPS handover failure can be determined to be handover to wrong cell.

Figure 10:
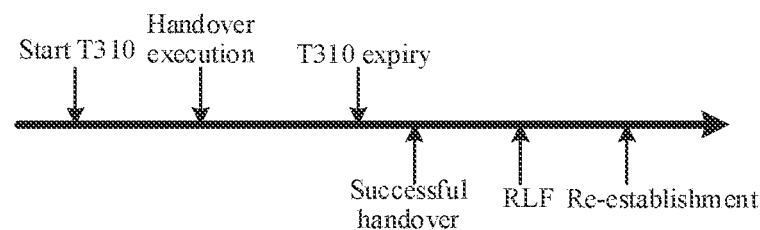
FIG. 10 is a sixth schematic flow diagram of a method for determining a type of a DAPS handover failure according to an embodiment of the present application.

FIG. 10 is a sixth schematic flow diagram of a method for determining a type of a DAPS handover failure according to an embodiment of the present application. As shown in FIG. 10, during the DAPS handover procedure, T310 expires in the source cell side, which results in an RLF for the terminal in the source cell, and then the terminal can record the information associated with the RLF, place it in a handover success report, or an RLF report, or a given report, and report it to the network side as the information associated with the DAPS handover failure. In case that an RLF occurs shortly after the terminal randomly accesses the target cell successfully, the terminal can record the failure information in a corresponding RLF report, where this failure information and the failure information of the source cell side can be placed in the same RLF report or different reports, and transmitted to the network side as the information associated with the DAPS handover failure.

The network side device analyzes the type of the DAPS handover failure based on the information associated with DAPS handover failure, and can determine, based on timer information at source cell side for DAPS handover and/or status indication information of source cell for DAPS handover, that an RLF occurs in the source cell side during the DAPS handover procedure, and determine, based on indication information for successful or failed DAPS handover and a period of time elapsed from lastly reception of a handover command message to a connection failure in an RLF report, that an RLF occurs shortly after the terminal randomly accesses the target cell successfully, and the terminal initiates an RRC connection re-establishment to attempt to access another cell different from both the target cell and the source cell, and then determine the type of the DAPS handover failure to be handover to wrong cell in this scenario.

In an embodiment, in case that the network side device determines, based on the information associated with the DAPS handover failure, that after the terminal fails to access the target cell during DAPS handover procedure, the terminal fails to transmit a failure message in the source cell, an RLF occurs in the source cell, and the terminal initiates an RRC connection re-establishment to attempt to access another cell different from both the target cell and the source cell, the type of the DAPS handover failure can be determined to be handover to wrong cell.

Figure 11:
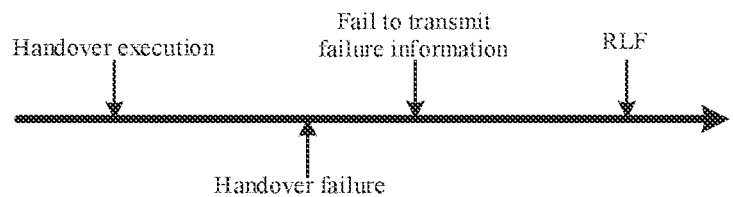
FIG. 11 is a seventh schematic flow diagram of a method for determining a type of a DAPS handover failure according to an embodiment of the present application.

For example, FIG. 11 is a seventh schematic flow diagram of a method for determining a type of a DAPS handover failure according to an embodiment of the present application. As shown in FIG. 11, during the DAPS handover, the random access of the terminal to the target cell fails, the terminal falls back to the source cell and attempts to transmit failure message to the network side, but the transmission of the failure message fails, and then since the RLF, the terminal triggers a re-establishment and attempts to access another different cell from both the target cell and the source cell.

In case of handover failure, the terminal can record the information associated with the handover failure, the information associated with the handover failure may be placed in a failure message and transmitted to the network side as information associated with the DAPS handover failure, or may be placed in an RLF report or a given report or message and transmitted to the network side as information associated with the DAPS handover failure. In case that the RLF occurs and the terminal triggers the re-establishment procedure, the terminal can record RLF information, can transmit it to the network side as information associated with DAPS handover failure through corresponding RLF report. The RLF report can be transmitted to the network side as the information associated with the DAPS handover failure together with the information associated with the handover failure, or the RLF report can be transmitted to the network side as the information associated with the DAPS handover failure separately.

The network side device analyzes the type of the DAPS handover failure based on the information associated with the DAPS handover failure, and can determine, based on timer information at source cell side for DAPS handover and/or status indication information of source cell for DAPS handover, and indication information for successful or failed DAPS handover, that the connections of the terminal in both the source cell and the target cell are failed during the handover procedure and the terminal initiates an RRC connection re-establishment to attempt to access another cell different from both the target cell and the source cell, where the network side does not receive failure information transmitted by the terminal, and then the type of the DAPS handover failure can be determined to be handover to wrong cell in this scenario.

In the present embodiment, in case that the terminal may transmit failure information but the transmission of the failure information is failed, the network side does not receive failure information, it can be determined that the terminal fails to transmit failure information, but it cannot be determined that the terminal does not transmit failure information.

In an embodiment, in case that the network side device determines, based on the information associated with the DAPS handover failure, that after the terminal fails to access the target cell during DAPS handover procedure, an RLF occurs in the source cell within a second given period of time after the terminal successfully transmits a failure message in the source cell, and the terminal initiates an RRC connection re-establishment to attempt to access another cell different from both the target cell and the source cell, the type of the DAPS handover failure can be determined to be handover to wrong cell.

FIG. 12 is an eighth schematic flow diagram of a method for determining a type of a DAPS handover failure according to an embodiment of the present application. As shown in FIG. 12, during DAPS handover, the random access of the terminal to the target cell fails, the terminal falls back to the source cell and successfully transmits a failure message to the network side device, and the terminal successfully falls back to the source cell, and then the terminal triggers re-establishment since the RLF occurs in the source cell shortly.

In case of handover failure, the terminal can record the information associated with the handover failure, the information associated with the handover failure may be placed in a failure message and transmitted to the network side as information associated with the DAPS handover failure, or may be placed in an RLF report or a given report or message and transmitted to the network side as information associated with DAPS handover failure. In case that the RLF occurs and the terminal triggers the re-establishment procedure, the terminal can record RLF information, and transmit it to the network side as information associated with DAPS handover failure through RLF report. The RLF report can be transmitted to the network side as the information associated with DAPS handover failure together with the information associated with the handover failure, or the RLF report can be transmitted to the network side as the information associated with the DAPS handover failure separately.

The network side device analyzes the type of the DAPS handover failure based on the information associated with the DAPS handover failure, and can determine, based on timer information at source cell side for DAPS handover and/or status indication information of source cell for DAPS handover, and indication information for successful or failed DAPS handover, that the connections of the terminal in both the source cell and the target cell are failed during the handover procedure and the terminal initiates an RRC connection re-establishment to attempt to access another cell different from both the target cell and the source cell, where the network side does not receive failure information transmitted by the terminal, and then the type of the DAPS handover failure can be determined to be handover to wrong cell in this scenario.

In an embodiment, based on any of the above embodiments, the information associated with the DAPS handover failure includes information associated with a DAPS handover and at least one or any combination of the following items:

failure information;
an RLF report; or
a handover success report;
where the information associated with the DAPS handover includes:
timer information at source cell side for DAPS handover and/or status indication information of source cell for DAPS handover;
indication information for successful or failed DAPS handover; and
DAPS handover indication information, used for determining that a handover is DAPS handover.

In an embodiment, since the terminal maintains a connection with the source cell during DAPS handover, an information record for the source cell side, i.e. information associated with DAPS handover, can be used for the analysis of the type of the DAPS handover failure.

In an embodiment, information associated with DAPS handover may include timer information at source cell side for DAPS handover and/or status indication information of source cell for DAPS handover.

In an embodiment, an initial value of the timer information at source cell side for DAPS handover is 0, used for recording a period of time from triggering the handover to occurrence of the connection failure in source cell. In case that no connection failure occurs in the source cell, a value of the timer is 0. After obtaining the timer information at source cell side for DAPS handover, the network side device determines that the value of the timer information at source cell side for DAPS handover is 0, which means that no connection failure occurred in the source cell, or the network side device determines that the value of the timer information at source cell side for DAPS handover is not 0, which means that a connection failure occurred in the source cell.

In an embodiment, status indication information of source cell for DAPS handover is used for indicating whether a failure occurred in the source cell. In one embodiment, whether a failure occurred in the source cell can be implicitly indicated by a source cell timer.

In an embodiment, the information associated with the DAPS handover can further include indication information for successful or failed DAPS handover.

The indication information for successful or failed DAPS handover is used for indicating whether the random access of the terminal to the target cell was successful.

In an embodiment, the information associated with the DAPS handover can further include DAPS handover indication information, where the DAPS handover indication information is used for determining that a handover is DAPS handover.

For example, the DAPS handover indication information indicates that the handover failure type of the handover procedure to be determined is whether a traditional handover procedure or a DAPS handover procedure. In case that the network side device determines, based on the DAPS handover indication information, that the handover failure type of the handover procedure to be determined is DAPS handover, the failure type of this handover procedure can be determined based on the method for determining the type of the DAPS handover failure according to the present embodiment.

In an embodiment, the information associated with the DAPS handover failure can include at least one of the followings:

failure information, which can be directly transmitted by the terminal to a source gNB to which the source cell belongs in case that the random access of the terminal to the target cell fails;

an RLF report, where in case that an RLF occurs in the source cell and/or target cell, and/or the random access to the target cell fails, the terminal can report the RLF report to the network side device; and the network side device can determine a connection status of the terminal based on relevant information in the RLF report, for example, the network side device can determine a period of time of the terminal stayed in a cell based on a period of time elapsed from lastly reception of a handover command message to a connection failure in the RLF report, and then determine whether the period of time of the terminal stayed in the cell exceeds a first given period of time or a second given period of time;

a handover success report, where in case that the random access of the terminal to the target cell is successful, the terminal can report a failure event observed by the terminal during the successful handover to enhance mobility robustness, for example, the terminal can collect the information associated with the handover procedure and report it to the network side as a handover success report.

In an embodiment, in case that the information associated with the DAPS handover failure includes multiple information or reports, each information or report can include terminal identification information. For example, an ID of the UE can be uniquely identified in the source cell or target cell for the handover, which can be cell radio network temporary identification (C-RNTI) or other IDs, used for associating multiple information or reports in the information associated with the DAPS handover failure.

In an embodiment, based on any of the above embodiments, the receiving information associated with DAPS handover failure transmitted by the terminal includes:
  receiving bearer information carrying the information associated with the DAPS handover, the bearer information including at least one or any combination of the following items:
  failure information;
  an RLF report;
  a handover success report; or
  a given report, only used for carrying the information associated with DAPS handover.

In an embodiment, in case that the network side device receives the information associated with the DAPS handover transmitted by the terminal, the information associated with the DAPS handover can be placed in the failure information and then be transmitted, and the failure information can be transmitted together with other messages or be transmitted separately.

In an embodiment, in case that the network side device receives the information associated with DAPS handover transmitted by the terminal, the information associated with the DAPS handover can be placed in RLF report and then be transmitted, and the RLF report can be transmitted together with other messages or be transmitted separately. The RLF report can be an RLF report generated by the terminal in case that an RLF occurred in the source cell and/or the target cell, or an RLF report generated by the terminal in case that the random access of the terminal to the target cell failed.

In an embodiment, in case that the network side receives the information associated with the DAPS handover transmitted by the terminal, the information associated with the DAPS handover can be placed in a handover success report, and the handover success report can be transmitted together with other messages or be transmitted separately.

In an embodiment, in case that the network side device receives the information associated with the DAPS handover transmitted by the terminal, the information associated with the DAPS handover can be transmitted as a separate report, and the separate report can be transmitted together with other messages or be transmitted separately.

In an embodiment, based on any of the above embodiments, the receiving information associated with DAPS handover failure transmitted by the terminal further includes:
  receiving the information associated with the DAPS handover failure through a network interface, where the network interface includes at least one or any combination of the following items: an XN interface, an NG interface, an X2 interface, an S1 interface, an F1 interface or an E1 interface.

In an embodiment, in case that the network side device receives the information associated with the DAPS handover failure through a network interface, the information associated with the DAPS handover failure can be transmitted by the terminal to the network side device directly, or can be transmitted to the network side device after forwarding in a node of the network side device, where in case that the information associated with DAPS handover failure is forwarded or transmitted between the network nodes, the information associated with DAPS handover failure can be forwarded between an XN interface, an NG interface, an X2 interface, an S1 interface, an F1 interface or an E1 interface.

In the method for determining the type of the DAPS handover failure according to the embodiment of the present application, the type of the DAPS handover failure can be determined based on the information associated with the DAPS handover failure reported by the terminal, which is applicable to the situation that both connections of the terminal in the source cell and the target cell may fail during DAPS handover procedure, can achieve a mobility robustness optimization in DAPS handover procedure, assist network optimization and improve handover success rate.

FIG. 13 is a ninth schematic flow diagram of a method for determining a type of a dual active protocol stack (DAPS) handover failure according to an embodiment of the present application. As shown in FIG. 13, the method is applied to terminal, including:
  step 1300: transmitting information associated with the DAPS handover failure, where the information associated with the DAPS handover failure is used for determining, by a network side device, the type of the DAPS handover failure.

In an embodiment, information associated with DAPS handover failure can be collected and uploaded to the network side device, and after receiving the information associated with the DAPS handover failure, the network side device can determine the type of the DAPS handover failure and complete DAPS optimization.

In traditional handover, after the handover is triggered, the UE releases a connection with the source cell, and maintains the connection with the source cell while during execution of a DAPS handover procedure. Therefore, for the analysis of DAPS handover failure type, an information of the source cell side is recorded. For adapting a situation that both connections of the terminal in the source cell and the target cell may fail during DAPS handover procedure, the information associated with the DAPS handover failure collected by the terminal and transmitted to the network side can include information of the source cell side and the target cell side for the handover.

In an embodiment, after receiving the information associated with DAPS handover failure, the network side device can determine connection statuses of the terminal at the source cell side and at the target cell side based on the information associated with the DAPS handover failure, and then determine the type of the DAPS handover failure.

In the method for determining the type of the DAPS handover failure according to the embodiment of the present application, by collecting and reporting the information associated with the DAPS handover failure to the network side device, the network side device can determine the type of the DAPS handover failure based on the information associated with the DAPS handover failure, which is applicable to the situation that both connections of the terminal in the source cell and the target cell may fail during DAPS handover procedure, can achieve a mobility robustness optimization in DAPS handover procedure, assist network optimization and improve handover success rate.

In an embodiment, based on any of the above embodiment, the information associated with the DAPS handover failure includes information associated with the DAPS handover and at least one or any combination of the following items:
  failure information;
  a radio link failure (RLF) report; or
  a handover success report;
  where the information associated with DAPS handover includes:
  timer information at source cell side for DAPS handover and/or status indication information of source cell for DAPS handover;
  indication information for successful or failed DAPS handover; and
  DAPS handover indication information, used for determining that a handover is DAPS handover.

In an embodiment, since a connection of the terminal with the source cell remains during DAPS handover, an information record for the source cell side, i.e. information associated with the DAPS handover, can be used for the analysis of DAPS handover failure type.

In an embodiment, the information associated with the DAPS handover may include timer information at source cell side for DAPS handover and/or status indication information of source cell for DAPS handover.

In an embodiment, an initial value of the timer information at source cell side for DAPS handover is 0, used for recording a length of time from triggering the handover to a failure occurs in source cell. In case that no connection failure occurs in the source cell, a value of the timer is 0. In case that after obtaining the timer information at source cell side for DAPS handover, the network side device determines that the value of the timer information at source cell side for DAPS handover is 0, which means that no connection failure occurred in the source cell, or the network side device determines that the value of the timer information at source cell side for DAPS handover is not 0, which means that a connection failure occurred in the source cell.

In an embodiment, the status indication information of source cell for DAPS handover used for indicating whether a failure occurred in the source cell. In one embodiment, whether a failure occurred in the source cell can be implicitly indicated by a source cell timer.

In an embodiment, the information associated with the DAPS handover can further include indication information for successful or failed DAPS handover.

The indication information for successful or failed DAPS handover is used for indicating whether the random access of the terminal to the target cell was successful.

In an embodiment, the information associated with DAPS handover can further include DAPS handover indication information, where the DAPS handover indication information is used for determining that a handover is DAPS handover.

For example, the DAPS handover indication information indicates that the handover failure type of the handover procedure to be determined is a traditional handover procedure or a DAPS handover procedure. In case that the network side device determines, based on the DAPS handover indication information, that the handover failure type of the handover procedure to be determined is DAPS handover, the failure type of this handover procedure can be determined based on the method for determining the type of the DAPS handover failure provided in the present embodiment.

In an embodiment, the information associated with the DAPS handover failure can include at least one of:
  failure information, which can be directly transmitted by the terminal to a source gNB to which the source cell belongs in case that the random access of the terminal to the target cell fails;
  an RLF report, where in case that an RLF occurs in the source cell and/or target cell, and/or the random access to the target cell fails, the terminal can report the RLF report to the network side; and the network side can determine a connection status of the terminal based on relevant information in the RLF report, for example, the network side device can determine a period of time of the terminal stayed in a cell based on a period of time elapsed from lastly reception of a handover command message to a connection failure in the RLF report, and then determine whether the period of time of the terminal stayed in the cell exceeds a first given period of time or a second given period of time;
  a handover success report, where in case that the random access of the terminal to the target cell is successful, the terminal can report a failure event observed by the terminal during the successful handover to enhance mobility robustness, for example, the terminal can collect the information associated with the handover procedure and report it to the network side device as a handover success report.

In an embodiment, in case that the information associated with DAPS handover failure includes multiple information or reports, each information or report can include terminal identification information. For example, an ID of the UE can be uniquely identified in the source cell or target cell for the handover, which can be cell radio network temporary identification (C-RNTI) or other IDs, used for associating multiple information or reports in the information associated with DAPS handover failure.

In an embodiment, based on any of the above embodiments, the transmitting information associated with DAPS handover failure includes:
  transmitting bearer information carrying the information associated with DAPS handover, the bearer information including at least one or any combination of the following items:
  failure information;
  an RLF report;

a handover success report; or a given report, only used for carrying the information associated with DAPS handover.

In an embodiment, in case that the network side device receives the information associated with DAPS handover transmitted by the terminal, the information associated with DAPS handover can be placed in the failure information and then be transmitted, and the failure information can be transmitted together with other messages or be transmitted separately.

In an embodiment, in case that the network side device receives the information associated with DAPS handover transmitted by the terminal, the information associated with DAPS handover can be placed in RLF report and then be transmitted, and the RLF report can be transmitted together with other messages or be transmitted separately. The RLF report can be an RLF report generated by the terminal in case that an RLF occurred in the source cell and/or the target cell, or an RLF report generated by the terminal in case that the random access of the terminal to the target cell failed.

In an embodiment, in case that the network side device receives the information associated with the DAPS handover transmitted by the terminal, the information associated with the DAPS handover can be placed in a handover success report, and the handover success report can be transmitted together with other messages or be transmitted separately.

In an embodiment, in case that the network side device receives the information associated with DAPS handover transmitted by the terminal, the information associated with DAPS handover can be transmitted as a separate report, and the separate report can be transmitted together with other messages or be transmitted separately.

In an embodiment, based on any of the above embodiments, the transmitting information associated with DAPS handover failure further includes:

transmitting the information associated with the DAPS handover failure through a network interface, where the network interface includes at least one or any combination of the following items: an XN interface, an NG interface, an X2 interface, an S1 interface, an F1 interface or an E1 interface.

In an embodiment, in case that the terminal transmits the information associated with DAPS handover failure, the information associated with DAPS handover failure can be transmitted by the terminal to the network side directly, or can be transmitted to the network side after forwarding in a node of the network side, where in case that the information associated with DAPS handover failure is forwarded or transmitted between the network nodes, the information associated with DAPS handover failure can be forwarded between an XN interface, an NG interface, an X2 interface, an S1 interface, an F1 interface or an E1 interface.

In the method for determining the type of the DAPS handover failure according to the embodiment of the present application, by collecting and reporting the information associated with the DAPS handover failure to the network side, the network side can determine the type of the DAPS handover failure based on the information associated with the DAPS handover failure, which is applicable to the situation that both connections of the terminal in the source cell and the target cell may fail during DAPS handover procedure, can achieve a mobility robustness optimization in DAPS handover procedure, assist network optimization and improve handover success rate.

The solutions according to the embodiments of the present application can be applicable to various systems, for example, 5G systems. For example, the applicable systems can be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal and a base station, and can further include a core network part, such as an evolved packet system (EPS), a 5G system (5GS), and the like.

The terminal in the embodiments of the present application can be a device that provides voice and/or data connectivity to a user, a handheld device with a wireless connection function, or other processing devices connected to a wireless modem. In different systems, the names of the terminal may be different. For example, in the 5G system, the terminal may be called as a user equipment (UE). A wireless terminal can communicate with one or more core networks (CNs) via a radio access network (RAN), and the wireless terminal can be a mobile terminal, such as a mobile phone (or cellular phone) and a computer with mobile terminal, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session triggered protocol (SIP) phone, a wireless local loop (WLL) station, a personal digital assistant (PDA) and other devices. A wireless terminal side device may also be called a system, a subscriber unit, a subscriber station, a mobile station, a mobile, a remote station, an access point, a remote terminal, an access terminal, a user terminal, a user agent, or a user device, which is not limited in the embodiments of the present application. Since the terminal side device and other network side devices (such as a core network side device, an access network side device (i.e. a base station)) together form a network being able to support communication, the terminal side device can be regarded as a network side device in the present application.

The network side device in the embodiments of the present application can be a base station, and the base station can include multiple cells providing services for the terminal. Depending on the specific scenario, the base station may be called an access point, or a device communicating with a wireless terminal through one or more sectors on the air interface in the access network, or other names. The network side device can be used for exchanging received air frames with internet protocol (IP) packets, and acting as a router between the wireless terminal and the rest of the access network, where the rest of the access network can include an IP communication network. The network side devices can also coordinate attribute management for the air interface. For example, the network side device in the embodiments of the present application may be a base transceiver station (BTS) in a global system for mobile communications (GSM) or a code division multiple access (CDMA), a node B in a wide-band code division multiple access (WCDMA), an evolutional node B (eNB or e-Node B) in a long term evolution (LTE) system, a 5G base station (gNB) in 5G network architecture (next generation system), a home evolved node B (HeNB), a relay node, a femto, or a pico base station (pico), etc., which is not limited in the embodiments of the present application. In some network structures, the network side device may include a centralized unit (CU) node and a distributed unit (DU) node, and the centralized unit and the distributed unit may be geographically separated.

FIG. 14 is a schematic structural diagram of a network side device according to an embodiment of the present application. As shown in FIG. 14, the network side device includes a memory 1401, a transceiver 1402, and a processor 1403.

The memory 1401 is used for storing a computer program; the transceiver 1402 is used for transmitting and receiving data under a control of the processor; the computer program, when executed by the processor 1403, causes the processor 1403 to perform the following operations:

receiving information associated with a dual active protocol stack (DAPS) handover failure transmitted by terminal; and determining a DAPS handover failure type based on the information associated with the DAPS handover failure.

The transceiver 1402 is used for transmitting and receiving data under a control of the processor 1403.

In FIG. 14, a bus architecture may include any number of interconnected buses and bridges, which are linked together through various circuits of one or more processors represented by processor 1403 and one or more memories represented by the memory 1401. The bus architecture can also link together various other circuits, such as peripherals, voltage regulators, and power management circuits. The bus interface provides an interface. Transceiver 1402 may include multiple elements, i.e., include a transmitter and a receiver, units for providing communication with various other devices over transmission media including wireless channels, wired channels, fiber optic cables, and the like. The processor 1403 is responsible for managing the bus architecture and general processing, and the memory 1401 can store data used by the processor 1403 when performing operations.

The processor 1403 may be a central processing unit (CPU), an application specific integrated circuit (ASIC), a field-programmable gate array (FPGA), or a complex programmable logic device (CPLD), the processor can also use a multi-core architecture.

In an embodiment, based on any of the above embodiments, the type of the DAPS handover failure includes any one of the following items: too early handover, too late handover, or handover to wrong cell;

the determining the type of the DAPS handover failure includes:

if determining that a connection failure of the terminal in a source cell, and a connection of the terminal in a target cell is successful or the terminal attempts to access another cell different from the source cell, determining the type of the DAPS handover failure to be too late handover;

if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the if determining that the connection failure of the terminal in the source cell, and the connection of the terminal in the target cell is successful or the terminal attempts to access another cell different from the source cell, determining the type of the DAPS handover failure to be too late handover includes any one of:

if determining that a radio link failure (RLF) occurs after the terminal has stayed for a period of time exceeding a first given period of time in the source cell, and the terminal initiates a radio resource control (RRC) connection re-establishment to attempt to access another cell different from the source cell, determining the type of the DAPS handover failure to be too late handover; or if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and an RLF occurs in the source cell during the DAPS handover procedure, determining the type of the DAPS handover failure to be too late handover.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the if determining that the connection failure of the terminal in the target cell, and the terminal successfully falls back to the source cell or initiates the re-establishment to attempt to access the source cell, determining the type of the DAPS handover failure to be too early handover includes any one of:

if determining that during DAPS handover procedure the terminal successfully accesses to the target cell and an RLF occurs within a first given period of time, and the terminal initiates an RRC connection re-establishment to attempt to access the source cell, determining the type of the DAPS handover failure to be too early handover; or if determining that access failure of the terminal in the target cell during DAPS handover procedure and the terminal successfully falls back to the source cell, and no RLF occurs within a second given period of time, determining the type of the DAPS handover failure to be too early handover.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the if determining that connection failure of the terminal in the source cell and connection failure of the terminal in the target cell, and the terminal attempts to access another cell different from both the source cell and the target cell, determining the type of the DAPS handover failure to be handover to wrong cell includes any one of:
  if determining that an RLF occurs in the source cell during DAPS handover procedure, and the terminal fails to access the target cell, and the terminal initiates an RRC connection re-establishment to attempt to access another cell different from both the target cell and the source cell, determining the type of the DAPS handover failure to be handover to wrong cell;
  if determining that the terminal successfully accesses to the target cell during DAPS handover procedure and an RLF occurs within a first given period of time, and the terminal initiates an RRC connection re-establishment to attempt to access another cell different from both the target cell and the source cell, determining the type of the DAPS handover failure to be handover to wrong cell;
  if determining that after the terminal fails to access the target cell during DAPS handover procedure, the terminal fails to transmit a failure message in the source cell, an RLF occurs in the source cell, and the terminal initiates an RRC connection re-establishment to attempt to access another cell different from both the target cell and the source cell, determining the type of the DAPS handover failure to be handover to wrong cell; or
  if determining that after the terminal fails to access the target cell during DAPS handover procedure, an RLF occurs in the source cell within a second given period of time after the terminal successfully transmits a failure message in the source cell, and the terminal initiates an RRC connection re-establishment to attempt to access another cell different from both the target cell and the source cell, determining the type of the DAPS handover failure to be handover to wrong cell.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the information associated with the DAPS handover failure includes information associated with the DAPS handover and at least one or any combination of the following items:
  failure information;
  an RLF report; or
  a handover success report;
  where the information associated with DAPS handover includes:
  timer information at source cell side for DAPS handover and/or status indication information of source cell for DAPS handover;
  indication information for successful or failed DAPS handover; and
  DAPS handover indication information, used for determining that a handover is DAPS handover.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the receiving information associated with DAPS handover failure transmitted by the terminal includes:
  receiving bearer information carrying the information associated with the DAPS handover, the bearer information including at least one or any combination of the following items:
  failure information;
  an RLF report;
  a handover success report; or
  a given report, only used for carrying the information associated with DAPS handover.

The above devices according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the receiving information associated with DAPS handover failure transmitted by the terminal includes:
  receiving the information associated with the DAPS handover failure through a network interface, where the network interface includes at least one or any combination of the following items: an XN interface, an NG interface, an X2 interface, an S1 interface, an F1 interface or an E1 interface.

The above devices according to the embodiments of the present application can perform all the method steps that can be implemented by the above-mentioned method embodiments, and can provide the same effect. The same parts and beneficial effects as the method embodiments are not repeated.

FIG. 15 is a schematic structural diagram of a terminal according to an embodiment of the present application. As shown in FIG. 15, the terminal includes a memory 1501, a transceiver 1502, and a processor 1503.

The memory 1501 is used for storing a computer program; the transceiver 1502 is used for transmitting and receiving data under a control of the processor; the computer program, when executed by the processor 1503, causes the processor 1503 to perform the following operations:
  transmitting information associated with a dual active protocol stack (DAPS) handover failure, where the information associated with the DAPS handover failure is used for determining a DAPS handover failure type by a network side device.

The transceiver 1502 is used for transmitting and receiving data under a control of the processor 1503.

In FIG. 15, a bus architecture may include any number of interconnected buses and bridges, which are linked together through various circuits of one or more processors represented by processor 1503 and one or more memories represented by the memory 1501. The bus architecture can also link together various other circuits, such as peripherals, voltage regulators, and power management circuits. The bus interface provides an interface. Transceiver 1502 may include multiple elements, i.e., include a transmitter and a receiver, units for providing communication with various other devices over transmission media including wireless channels, wired channels, fiber optic cables, and the like. For different user equipment (UE), the user interface 1504 can be an interface capable of externally or internally connecting the required equipment, and the connected equipment includes, but not limited to, a keypad, a display, a speaker, a microphone, a joystick, and the like.

The processor 1503 is responsible for managing the bus architecture and general processing, and the memory 1501 can store data used by the processor 1503 when performing operations.

The processor 1503 may be a central processing unit (CPU), an application specific integrated circuit (ASIC), a field-programmable gate array (FPGA), or a complex programmable logic device (CPLD), the processor can also use a multi-core architecture.

The processor is used for calling the computer program stored in the memory and performing any of the methods according to the embodiments of the present application based on obtained executable instructions. The processor and the memory may be physically separated.

The above terminals according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the information associated with the DAPS handover failure includes information associated with the DAPS handover and at least one or any combination of the following items:
 failure information;
 a radio link failure (RLF) report; or
 a handover success report;
 where the information associated with DAPS handover includes:
 timer information at source cell side for DAPS handover and/or status indication information of source cell for DAPS handover;
 indication information for successful or failed DAPS handover; and
 DAPS handover indication information, used for determining that a handover is DAPS handover.

The above terminals according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the transmitting information associated with DAPS handover failure includes:
 transmitting bearer information carrying the information associated with the DAPS handover, the bearer information including at least one or any combination of the following items:
 failure information;
 an RLF report;
 a handover success report; or
 a given report, only used for carrying the information associated with DAPS handover.

The above terminals according to the embodiments of the present application can perform all the method steps that can be implemented by the above-mentioned method embodiments, and can provide the same effect. The same parts and beneficial effects as the method embodiments are not repeated.

In an embodiment, based on any of the above embodiments, the transmitting information associated with DAPS handover failure includes:
 transmitting the information associated with the DAPS handover failure through a network interface, where the network interface includes at least one or any combination of the following items: an XN interface, an NG interface, an X2 interface, an S1 interface, an F1 interface or an E1 interface.

The above terminals according to the embodiments of the present application can perform all the method steps that can be implemented by the above-mentioned method embodiments, and can provide the same effect. The same parts and beneficial effects as the method embodiments are not repeated.

FIG. 16 is a schematic structural diagram of an apparatus for determining a type of a dual active protocol stack (DAPS) handover failure according to an embodiment of the present application. As shown in FIG. 16, the apparatus includes a receiving module 1610 and a determining module 1620;
 the receiving module 1610, is used for receiving information associated with DAPS handover failure transmitted by terminal; and
 the determining module 1620, is used for determining a DAPS handover failure type based on the information associated with the DAPS handover failure.

In an embodiment, in the apparatus for determining DAPS handover failure type, after receiving the information associated with the DAPS handover failure transmitted by the terminal through the receiving module 1610, the type of the DAPS handover failure can be determined through the determining module 1620 based on the information associated with the DAPS handover failure.

In the apparatus for determining DAPS handover failure type according to the embodiment of the present application, the type of the DAPS handover failure can be determined based on the information associated with the DAPS handover failure reported by the terminal, which is applicable to the situation that both connections of the terminal in the source cell and the target cell may fail during DAPS handover procedure, can achieve a mobility robustness optimization in DAPS handover procedure, assist network optimization and improve handover success rate.

The above apparatuses according to the embodiments of the present application can perform all the method steps that can be implemented by the above-mentioned method embodiments, and can provide the same effect. The same parts and beneficial effects as the method embodiments are not repeated.

Figure 17:
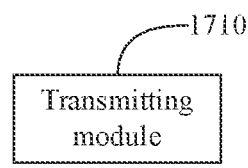
FIG. 17 is a schematic structural diagram of another apparatus for determining a type of a DAPS handover failure according to an embodiment of the present application.

FIG. 17 is a schematic structural diagram of another apparatus for determining a type of a DAPS handover failure according to an embodiment of the present application. As shown in FIG. 17, the apparatus includes a transmitting module 1710,
 where the transmitting module 1710 is used for transmitting information associated with the DAPS handover failure, where the information associated with the DAPS handover failure is used for determining a DAPS handover failure type by a network side device.

In an embodiment, in the apparatus for determining DAPS handover failure type, the information associated with the DAPS handover failure used for determining the type of the DAPS handover failure by the network side is transmitted through the transmitting module 1710, and after receiving the information associated with the DAPS handover failure, the network side device determines the type of the DAPS handover failure.

In the apparatus for determining DAPS handover failure type according to the embodiment of the present application, by collecting and reporting the information associated with the DAPS handover failure to the network side, the network side can determine the type of the DAPS handover failure based on the information associated with the DAPS handover failure, which is applicable to the situation that both connections of the terminal in the source cell and the target cell may fail during DAPS handover procedure, can achieve a mobility robustness optimization in DAPS handover procedure, assist network optimization and improve handover success rate.

The above apparatuses according to the embodiments of the present application can perform all the method steps that can be implemented by the above-mentioned method embodiments, and can provide the same effect. The same parts and beneficial effects as the method embodiments are not repeated.

It should be noted that, the division of units/modules in the embodiments of the present application is schematic, and is only a logical function division, and there can be other division manners in actual implementation. In addition, the functional units in the various embodiments of the present application can be integrated into one processing unit, or each unit can exist alone physically, or two or more units can be integrated into one unit. The above-mentioned integrated unit can be implemented in the form of hardware or software functional unit.

In case that the integrated unit is implemented in the form of a software functional unit and sold or used as an independent product, it can be stored in a computer readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

The above apparatuses according to the embodiments of the present application can perform all the method steps that can be implemented by the above-mentioned method embodiments, and can provide the same effect. The same parts and beneficial effects as the method embodiments are not repeated.

Based on any of the above embodiments, an embodiment of the present application provides a non-transitory computer readable storage medium storing computer programs that cause a processor to perform the methods in the above embodiments, which is applied to network side device, where the method includes:
  receiving information associated with a dual active protocol stack (DAPS) handover failure transmitted by a terminal; and
  determining a type of the DAPS handover failure based on the information associated with the DAPS handover failure.

Based on any of the above embodiments, an embodiment of the present application provides a non-transitory computer readable storage medium storing computer programs that cause a processor to perform the methods in the above embodiments, which is applied to terminal, where the method includes:
  transmitting information associated with a DAPS handover failure, where the information associated with the DAPS handover failure is used for determining a type of the DAPS handover failure by a network side device.

The above non-transitory computer readable storage medium according to the embodiments of the present application enables the processor to perform all the method steps implemented by the above method embodiments and achieve the same effects. The same parts and beneficial effects as the method embodiments are not repeated.

The computer readable storage medium can be any available medium or data storage device that can be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These computer-executable instructions may be stored in computer-readable memory capable of directing a computer or other programmable data processing apparatus to operate in a particular manner, and the instructions stored in the computer-readable memory may result in a manufacture including instruction means, the instruction means can perform the functions specified in one or more flows of the flowchart and/or one or more blocks of the block diagram.

These computer-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:
1. A method for determining a type of a dual active protocol stack (DAPS) handover failure, applied to a network side device, comprising:
  receiving information associated with the DAPS handover failure transmitted by a terminal; and determining the type of the DAPS handover failure based on the information associated with the DAPS handover failure;

wherein the type of the DAPS handover failure comprises any one of the following items: too early handover, too late handover, or handover to wrong cell;

the determining the type of the DAPS handover failure comprises:

if determining that a connection failure of the terminal in a source cell, and a connection of the terminal in a target cell is successful or the terminal attempts to access another cell different from the source cell, determining the type of the DAPS handover failure to be too late handover;

if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

2. The method of claim 1, wherein the if determining that the connection failure of the terminal in the source cell, and the connection of the terminal in the target cell is successful or the terminal attempts to access another cell different from the source cell, determining the type of the DAPS handover failure to be too late handover comprises any one of:

if determining that a radio link failure (RLF) occurs after the terminal has stayed for a period of time exceeding a first given period of time in the source cell, and the terminal initiates a radio resource control (RRC) connection re-establishment to attempt to access another cell different from the source cell, determining the type of the DAPS handover failure to be too late handover; or if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and a radio link failure (RLF) occurs in the source cell during the DAPS handover procedure, determining the type of the DAPS handover failure to be too late handover.

3. The method of claim 1, wherein the if determining that the connection failure of the terminal in the target cell, and the terminal successfully falls back to the source cell or initiates the re-establishment to attempt to access the source cell, determining the type of the DAPS handover failure to be too early handover comprises any one of:

if determining that during DAPS handover procedure the terminal successfully accesses to the target cell and a radio link failure (RLF) occurs within a first given period of time, and the terminal initiates a radio resource control (RRC) connection re-establishment to attempt to access the source cell, determining the type of the DAPS handover failure to be too early handover; or if determining that access failure of the terminal in the target cell during DAPS handover procedure and the terminal successfully falls back to the source cell, and no radio link failure (RLF) occurs within a second given period of time, determining the type of the DAPS handover failure to be too early handover.

4. The method of claim 1, wherein the if determining that connection failure of the terminal in the source cell and connection failure of the terminal in the target cell, and the terminal attempts to access another cell different from both the source cell and the target cell, determining the type of the DAPS handover failure to be handover to wrong cell comprises any one of:

if determining that a radio link failure (RLF) occurs in the source cell during DAPS handover procedure, and the terminal fails to access the target cell, and the terminal initiates a radio resource control (RRC) connection re-establishment to attempt to access another cell different from both the target cell and the source cell, determining the type of the DAPS handover failure to be handover to wrong cell;

if determining that the terminal successfully accesses to the target cell during DAPS handover procedure and a radio link failure (RLF) occurs within a first given period of time, and the terminal initiates a radio resource control (RRC) connection re-establishment to attempt to access another cell different from both the target cell and the source cell, determining the type of the DAPS handover failure to be handover to wrong cell;

if determining that after the terminal fails to access the target cell during DAPS handover procedure, the terminal fails to transmit a failure message in the source cell, a radio link failure (RLF) occurs in the source cell, and the terminal initiates a radio resource control (RRC) connection re-establishment to attempt to access another cell different from both the target cell and the source cell, determining the type of the DAPS handover failure to be handover to wrong cell; or if determining that after the terminal fails to access the target cell during DAPS handover procedure, a radio link failure (RLF) occurs in the source cell within a second given period of time after the terminal successfully transmits a failure message in the source cell, and the terminal initiates a radio resource control (RRC) connection re-establishment to attempt to access another cell different from both the target cell and the source cell, determining the type of the DAPS handover failure to be handover to wrong cell.

5. The method of claim 1, wherein the information associated with the DAPS handover failure comprises information associated with a DAPS handover and at least one or any combination of the following items:

failure information;

a radio link failure (RLF) report; or a handover success report;

wherein the information associated with the DAPS handover comprises:

timer information at source cell side for DAPS handover and/or status indication information of source cell for DAPS handover;

indication information for successful or failed DAPS handover; and

DAPS handover indication information, used for determining that a handover is DAPS handover.

6. A method for determining a type of a dual active protocol stack (DAPS) handover failure, applied to a terminal, comprising:

transmitting information associated with the DAPS handover failure, wherein the information associated with the DAPS handover failure is used for determining, by a network side device, the type of the DAPS handover failure;

wherein the type of the DAPS handover failure comprises any one of the following items: too early handover, too late handover, or handover to wrong cell;

if determining that a connection failure of the terminal in a source cell, and a connection of the terminal in a target cell is successful or the terminal attempts to access another cell different from the source cell, determining the type of the DAPS handover failure to be too late handover;

if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

7. The method of claim 6, wherein the information associated with the DAPS handover failure comprises information associated with a DAPS handover and at least one or any combination of the following items:
failure information;
a radio link failure (RLF) report; or
a handover success report;
wherein the information associated with the DAPS handover comprises:
timer information at source cell side for DAPS handover and/or status indication information of source cell for DAPS handover;
indication information for successful or failed DAPS handover; and
DAPS handover indication information, used for determining that a handover is DAPS handover.

8. The method of claim 7, wherein the transmitting information associated with the DAPS handover failure comprises:
transmitting bearer information carrying the information associated with the DAPS handover, the bearer information comprising at least one or any combination of the following items:
failure information;
a radio link failure (RLF) report;
a handover success report; or
a given report, only used for carrying the information associated with the DAPS handover.

9. The method of claim 6, wherein the transmitting information associated with the DAPS handover failure comprises:
transmitting the information associated with the DAPS handover failure through a network interface, wherein the network interface comprises at least one or any combination of the following items: an XN interface, an NG interface, an X2 interface, an S1 interface, an F1 interface or an E1 interface.

10. A terminal, comprising:
a processor,
a memory storing a computer program, and
a transceiver transmitting and receiving data under a control of the processor,
wherein the computer program, when executed by the processor, causes the processor to perform the method of claim 6.

11. The terminal of claim 10, wherein the information associated with the DAPS handover failure comprises information associated with a DAPS handover and at least one or any combination of the following items:
failure information;
a radio link failure (RLF) report; or
a handover success report;
wherein the information associated with the DAPS handover comprises:
timer information at source cell side for DAPS handover and/or status indication information of source cell for DAPS handover;
indication information for successful or failed DAPS handover; and
DAPS handover indication information, used for determining that a handover is DAPS handover.

12. The terminal of claim 11, wherein the transmitting information associated with the DAPS handover failure comprises:
transmitting bearer information carrying the information associated with the DAPS handover, the bearer information comprising at least one or any combination of the following items:
failure information;
a radio link failure (RLF) report;
a handover success report; or
a given report, only used for carrying the information associated with the DAPS handover.

13. The terminal of claim 10, wherein the transmitting information associated with the DAPS handover failure comprises:
transmitting the information associated with the DAPS handover failure through a network interface, wherein the network interface comprises at least one or any combination of the following items: an XN interface, an NG interface, an X2 interface, an S1 interface, an F1 interface or an E1 interface.

14. A network side device, comprising:
a processor,
a memory storing a computer program, and
a transceiver transmitting and receiving data under a control of the processor,
wherein the computer program, when executed by the processor, causes the processor to perform the following operations of:
receiving information associated with a dual active protocol stack (DAPS) handover failure transmitted by a terminal; and
determining a type of the DAPS handover failure based on the information associated with the DAPS handover failure;
the type of the DAPS handover failure comprises any one of the following items: too early handover, too late handover, or handover to wrong cell;
the determining the type of the DAPS handover failure comprises:
if determining that a connection failure of the terminal in a source cell, and a connection of the terminal in a target cell is successful or the terminal attempts to access another cell different from the source cell, determining the type of the DAPS handover failure to be too late handover;
if determining that a connection failure of the terminal in a target cell, and the terminal successfully falls back to a source cell or initiates a re-establishment to attempt to access the source cell, determining the type of the DAPS handover failure to be too early handover; or if determining that connection failure of the terminal in a source cell and connection failure of the terminal in a target cell, and the terminal attempts to access another cell different from both the source cell and the target cell, determining the type of the DAPS handover failure to be handover to wrong cell.

15. The network side device of claim 14, wherein the if determining that the connection failure of the terminal in the source cell, and the connection of the terminal in the target cell is successful or the terminal attempts to access another cell different from the source cell, determining the type of the DAPS handover failure to be too late handover comprises any one of:

if determining that a radio link failure (RLF) occurs after the terminal has stayed for a period of time exceeding a first given period of time in the source cell, and the terminal initiates a radio resource control (RRC) connection re-establishment to attempt to access another cell different from the source cell, determining the type of the DAPS handover failure to be too late handover; or if determining that after the terminal has stayed for a period of time exceeding a first given period of time in the source cell, and has initiated a DAPS handover, and successfully accesses to the target cell and the terminal has stayed for a period of time exceeding the first given period of time in the target cell, and a radio link failure (RLF) occurs in the source cell during the DAPS handover procedure, determining the type of the DAPS handover failure to be too late handover.

16. The network side device of claim 14, wherein the if determining that the connection failure of the terminal in the target cell, and the terminal successfully falls back to the source cell or initiates the re-establishment to attempt to access the source cell, determining the type of the DAPS handover failure to be too early handover comprises any one of:

if determining that during DAPS handover procedure the terminal successfully accesses to the target cell and a radio link failure (RLF) occurs within a first given period of time, and the terminal initiates a radio resource control (RRC) connection re-establishment to attempt to access the source cell, determining the type of the DAPS handover failure to be too early handover; or if determining that access failure of the terminal in the target cell during DAPS handover procedure and the terminal successfully falls back to the source cell, and no radio link failure (RLF) occurs within a second given period of time, determining the type of the DAPS handover failure to be too early handover.

17. The network side device of claim 14, wherein the if determining that connection failure of the terminal in the source cell and connection failure of the terminal in the target cell, and the terminal attempts to access another cell different from both the source cell and the target cell, determining the type of the DAPS handover failure to be handover to wrong cell comprises any one of:

if determining that a radio link failure (RLF) occurs in the source cell during DAPS handover procedure, and the terminal fails to access the target cell, and the terminal initiates a radio resource control (RRC) connection re-establishment to attempt to access another cell different from both the target cell and the source cell, determining the type of the DAPS handover failure to be handover to wrong cell;

if determining that the terminal successfully accesses to the target cell during DAPS handover procedure and a radio link failure (RLF) occurs within a first given period of time, and the terminal initiates a radio resource control (RRC) connection re-establishment to attempt to access another cell different from both the target cell and the source cell, determining the type of the DAPS handover failure to be handover to wrong cell;

if determining that after the terminal fails to access the target cell during DAPS handover procedure, the terminal fails to transmit a failure message in the source cell, a radio link failure (RLF) occurs in the source cell, and the terminal initiates a radio resource control (RRC) connection re-establishment to attempt to access another cell different from both the target cell and the source cell, determining the type of the DAPS handover failure to be handover to wrong cell; or if determining that after the terminal fails to access the target cell during DAPS handover procedure, a radio link failure (RLF) occurs in the source cell within a second given period of time after the terminal successfully transmits a failure message in the source cell, and the terminal initiates a radio resource control (RRC) connection re-establishment to attempt to access another cell different from both the target cell and the source cell, determining the type of the DAPS handover failure to be handover to wrong cell.

18. The network side device of claim 14, wherein the information associated with the DAPS handover failure comprises information associated with a DAPS handover and at least one or any combination of the following items:

failure information;

a radio link failure (RLF) report; or a handover success report;

wherein the information associated with the DAPS handover comprises:

timer information at source cell side for DAPS handover and/or status indication information of source cell for DAPS handover;

indication information for successful or failed DAPS handover; and

DAPS handover indication information, used for determining that a handover is DAPS handover.

\* \* \* \* \*